(12) United States Patent (10) Patent No.: US 7,708,040 B2
Stager (45) Date of Patent: May 4, 2010

(54) HIGH SPEED PLANER HEAD

(75) Inventor: Bradley R. Stager, Beaverton, OR (US)

(73) Assignee: Key Knife, Inc., Tualatin, OR (US)

( * ) Notice: Subject to any disclaimer, the term of this patent is extended or adjusted under 35 U.S.C. 154(b) by 986 days.

(21) Appl. No.: 11/346,829

(22) Filed: Feb. 3, 2006

(65) Prior Publication Data

US 2006/0124200 A1 Jun. 15, 2006

Related U.S. Application Data

(63) Continuation-in-part of application No. 10/802,582, filed on Mar. 16, 2004, now Pat. No. 7,343,946.

(51) Int. Cl.
*B27C 1/00* (2006.01)

(52) U.S. Cl. .................... 144/176; 144/218; 144/241

(58) Field of Classification Search ................ 144/176, 144/218, 220, 221, 230, 240, 241; 407/40–42, 407/47, 49, 61, 113
See application file for complete search history.

(56) References Cited

U.S. PATENT DOCUMENTS

| | | | |
|---|---|---|---|
| 1,830,813 A | | 10/1931 | Tautz |
| 3,467,416 A | | 9/1969 | Gourley |
| 3,613,197 A | * | 10/1971 | Stier .......................... 407/113 |
| 3,742,564 A | | 7/1973 | Boboltz et al |
| 3,887,975 A | | 6/1975 | Sorice et al. |
| 4,169,690 A | * | 10/1979 | Kendra ....................... 407/90 |
| 4,400,117 A | | 8/1983 | Smith |
| 4,652,182 A | | 3/1987 | Mellert |
| 5,176,191 A | * | 1/1993 | Owens ....................... 144/230 |
| 5,188,488 A | | 2/1993 | Nakayama et al. |
| 5,201,352 A | | 4/1993 | Hult |
| 5,368,077 A | | 11/1994 | Croghan et al. |
| 5,741,095 A | | 4/1998 | Charron et al. |
| 5,819,826 A | | 10/1998 | Schmatjen |
| 6,119,741 A | * | 9/2000 | Rowe et al. .................. 144/230 |
| 6,168,104 B1 | | 1/2001 | Lin et al. |
| 6,203,251 B1 | * | 3/2001 | Oppelt et al. ................. 407/48 |

(Continued)

FOREIGN PATENT DOCUMENTS

DE 25 04 012 10/1975

(Continued)

OTHER PUBLICATIONS

EPO, European Search Report with Annex dated Jun. 23, 2005, pp. 1-4.

(Continued)

*Primary Examiner*—Shelley Self
(74) *Attorney, Agent, or Firm*—Portland Intellectual Property, LLC

(57) ABSTRACT

A high speed planer head. A threaded member having a frustoconical portion wedges against a knife, to clamp a knife to a hub for rotating the knife about an axis of revolution. The knife has a front and back side, two cutting edges and mirror image symmetry about a mirror plane passing through the knife. To cut both a planar face and two opposed, radiused corners, the cutting edges include respective linear face-cutting portions disposed between two concave, arcuate corner-cutting portions.

15 Claims, 19 Drawing Sheets

U.S. PATENT DOCUMENTS

| | | | |
|---|---|---|---|
| 6,474,210 B1 | 11/2002 | Nel et al. | |
| 6,591,878 B2 * | 7/2003 | Hinchliff | 144/241 |
| 6,644,369 B1 * | 11/2003 | Chiang | 144/230 |
| 6,846,135 B2 | 1/2005 | Kuroda et al. | |
| 7,048,476 B2 * | 5/2006 | Misenheimer et al. | 407/67 |
| 7,069,969 B2 * | 7/2006 | Knappett et al. | 144/230 |
| 7,343,946 B2 * | 3/2008 | Stager | 144/176 |

FOREIGN PATENT DOCUMENTS

| | | |
|---|---|---|
| DE | 196 23 507 C1 | 11/1997 |
| EP | 0 005 906 A1 | 12/1979 |
| EP | 0 566 858 A | 10/1993 |
| FR | 2 760 674 A | 9/1998 |

OTHER PUBLICATIONS

EPO, Partial European Search Report dated Jun. 23, 2005, pp. 1-4.
Forintek Canada Corp., High Speed Planer Adjustment Manual, printed 1991, pp. 1-34.
Pallman, Model KW-16 Rotor "Kontur vom Messeraufnahme" diagram, 1 pages.
U.S. Appl. No. 10/802,582 (parent application).
European Search Report No. E 05 01 9139 dated Sep. 4, 2006, mailed Sep. 14, 2006.

* cited by examiner

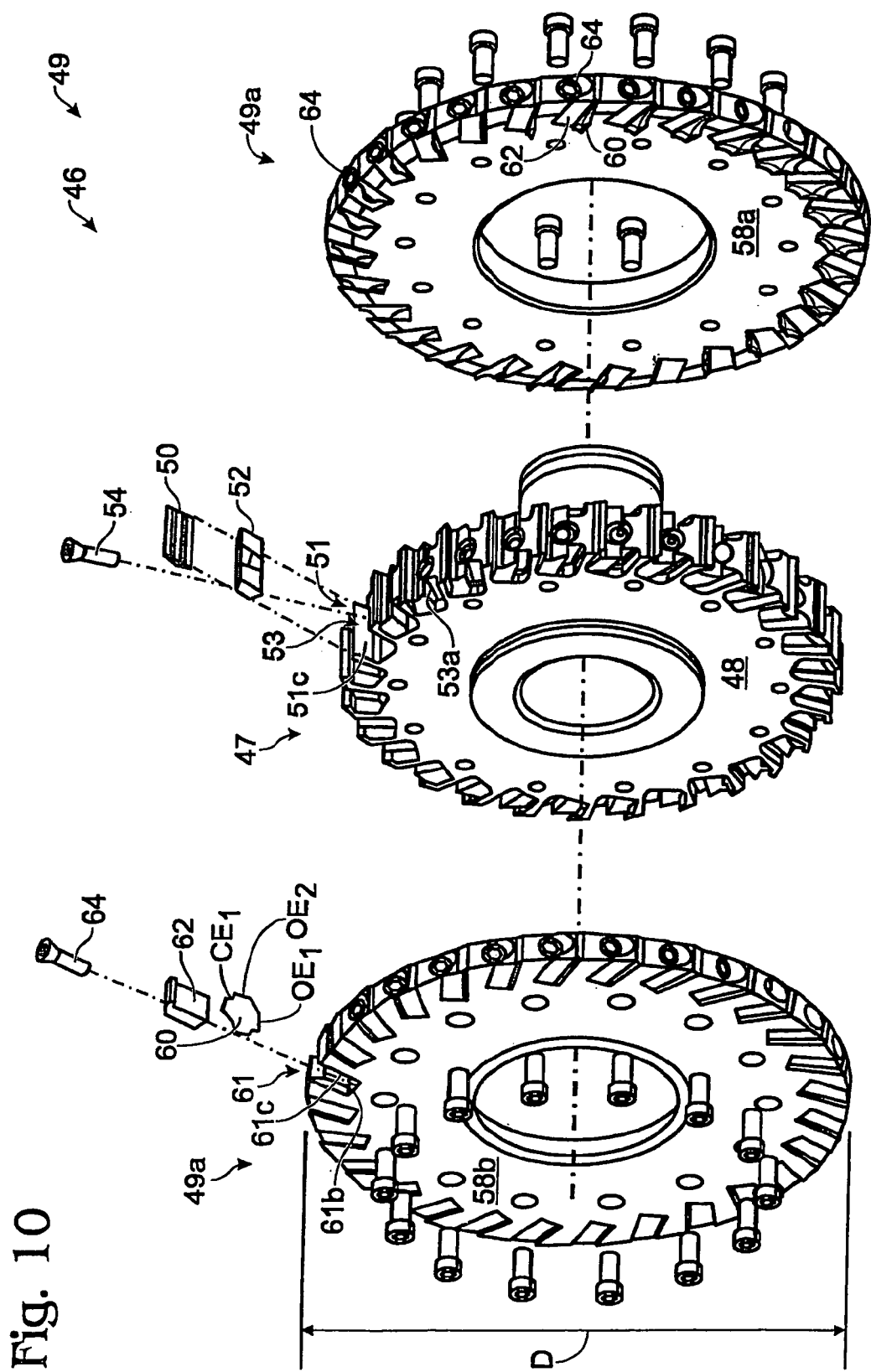

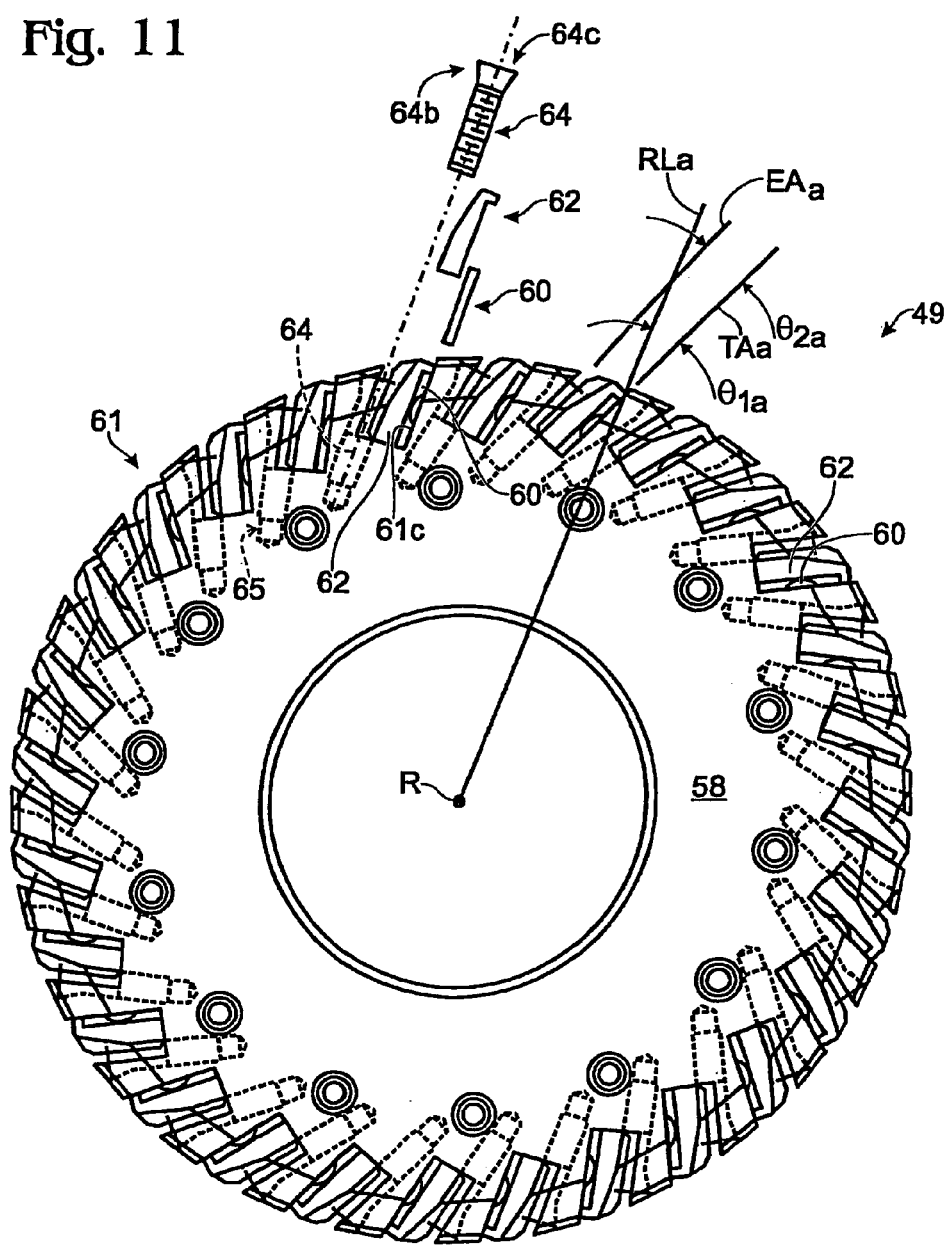

HIGH SPEED PLANER HEAD

RELATED APPLICATION

This is a continuation-in-part of U.S. Ser. No. 10/802,582, filed Mar. 16, 2004 now U.S. Pat. No. 7,343,946.

FIELD OF THE INVENTION

The present invention relates to a high speed planer head, such as for use in commercial manufacturing of construction lumber and finished wood products.

BACKGROUND

The finish on construction lumber, such as cut from logs into 2×4, 2×6, 2×12, and 4×4 nominal dimensions, has become increasingly important as a result of the trend for such construction lumber to be sold in retail outlets, such as the large home improvement chain stores, to "do-it-yourself" (DIY) consumers. While construction lumber is typically covered with sheet rock or gypsum board and so is not visible in finished construction, DIY consumers often select and purchase construction lumber primarily on the basis of surface finish. Accordingly, well finished construction lumber can command a premium price, and construction lumber that is not well finished may be difficult to sell.

Commercial planer heads include a plurality of elongate knives spaced circumferentially on a cylindrical hub rotating at high speed. The elongate axes of the knives are typically, but not necessarily, aligned with the axis of rotation. The wood travels relative to the head in a direction perpendicular to the axis of rotation of the hub, the knives cutting a surface on the wood. The resulting surface finish is affected by a number of factors, e.g., the extent to which the planer head is in balance, the density of knives on the planer head, the speed of rotation, the speed of travel of the wood, and the ability of the apparatus to efficiently keep chips away from the cutting surface as it is being cut.

Standard practice provides for statically balancing the knives and knife assemblies carried by the hub as well as dynamically balancing the hub and the shaft to which the hub is attached (or with which the hub is integrally formed). The speed of rotation of the head is set as high as practical, and the speed of travel of the wood is set as high as possible while still providing acceptable surface finish, to increase the speed of production. Some "chip marks" occur as a result of chips remaining on the cutting surface as the wood is being cut and have been accepted in the prior art.

With a given degree of balancing and speed of rotation of the planer head, increasing the speed of wood travel to obtain further efficiency increases will decrease the quality of the surface finish, and it would be advantageous either to be able to increase the speed while maintaining the quality of surface finish, or maintain the speed and improve the quality of the surface finish.

One means for increasing the surface quality given the limitations noted above is to increase the frequency of cutting by increasing the density of knives on the planer head. Particularly, the parallel and circumferentially distributed cutting edges of the knives should be spaced as close together as possible. However, each knife must be removable so that the knife can be sharpened or replaced. The knives are typically clamped in knife assemblies by screws. The screws may bear on a block of metal called a "gib" that in turn bears on the knife, the end of the screw may bear directly on the knife, or the screw may extend into a collar that wedges against the knife. In all cases, the construction methodology places limits on the potential for increasing the density of the knives.

Typically, prior art knives have a straight cutting edge and one or two radiused or semi-circularly curved cutting edges at respective ends of the straight cutting edge. Where only one curved cutting edge is employed, the knives are alternated in upside-down and right-side-up position so that two knives together cut respective opposite corners of the wood and each knife cuts the straight face of the wood so that the straight face of the wood is twice cut. In either case, a straight cutting edge is physically merged with a curved cutting edge. In a process known as "jointing," used for sharpening the knives as the knives are installed in the planer head and as the head is rotating, wherein a fixed stone is introduced against the rotating knives, what is known in the art as "relief" is lost for the outer portions of the curved cutting edges. This lack of relief results in hammering the wood at the corners, degrading surface finish.

Another problem in the prior art is adjusting the planer head between cutting an article of wood from green wood stock to cutting an article of the same nominal size from dry wood stock, and vice-versa. This has required replacing the complete planer head, which is costly.

There is a need, therefore, for a high speed planer head provided according to the present invention that solves the aforementioned problems and provides additional features and advantages.

SUMMARY OF THE INVENTION

A planer head according to the invention has a knife, a hub for rotating the knife about an axis of revolution, and a threaded member for clamping the knife to the hub. The knife has a front and back side, two cutting edges and mirror image symmetry about a mirror plane passing through the knife. The hub has a pocket for receiving the back side of the knife against a supporting wall of the pocket and a threaded hole. The threaded member has a frustoconical ramping portion for producing a wedging force against the knife when the threaded member is threaded into the hole.

To cut both a planar face and two opposed, radiused corners, the cutting edges include respective linear face-cutting portions disposed between two concave, arcuate corner-cutting portions. Preferably, the corner-cutting portions are semi-circular and the knife has an attack relief angle $\gamma$ that is preferably in the range 25-40 degrees and that is fixed over at least the face-cutting and corner-cutting portions. Preferably in addition, the knife includes two spaced apart deflector ridges projecting from the front side.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 10 is an exploded view of a preferred configuration of the planer head of FIG. 8A.

FIG. 11 is an end view of a corner-cutting planer head according to the present invention.

DETAILED DESCRIPTION OF A PREFERRED EMBODIMENT

Figure 1A:
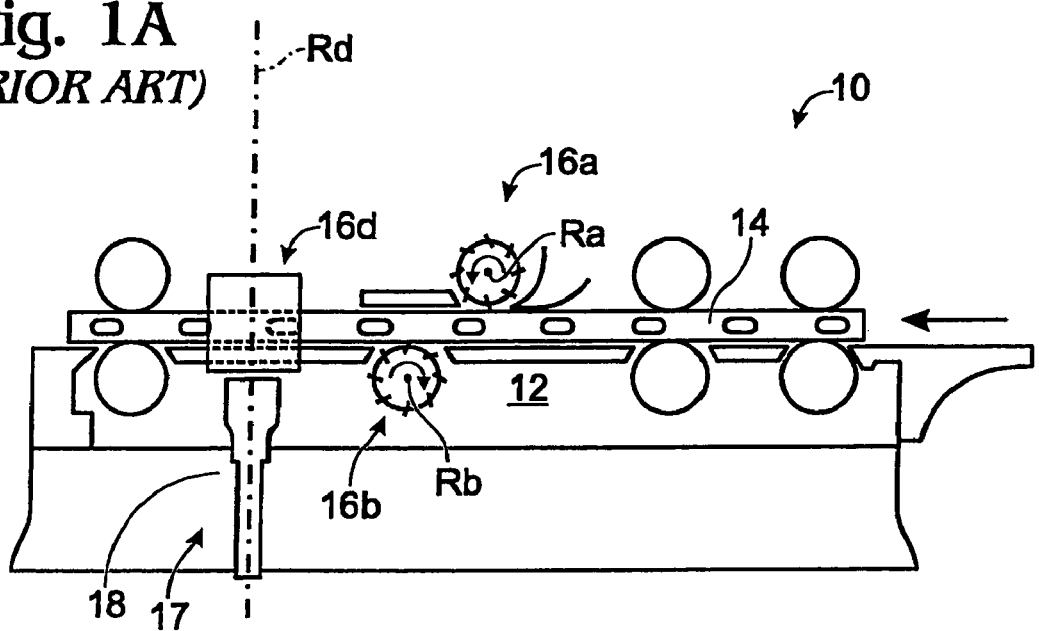
FIG. 1A is side elevation of a prior art planing apparatus.
Figure 1B:
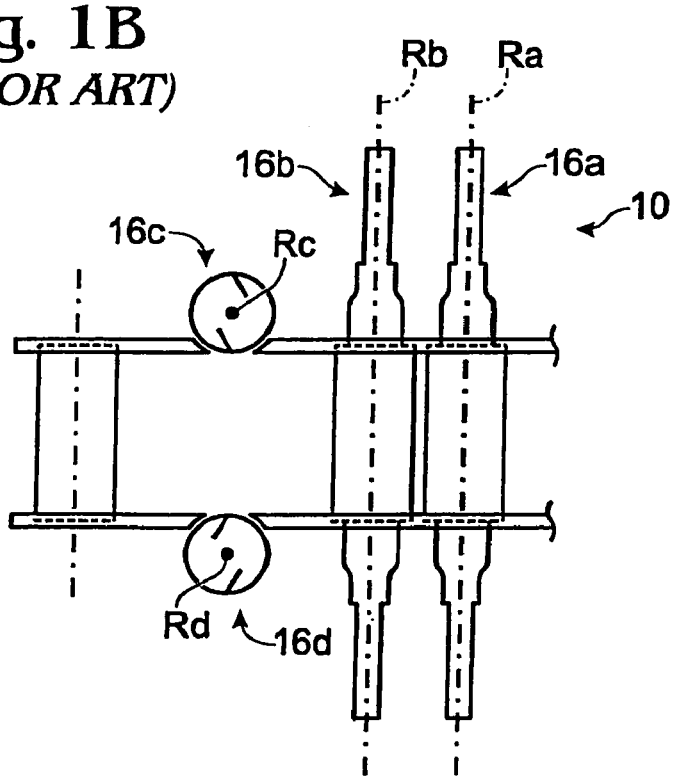
FIG. 1B is a top view of the planing apparatus of FIG. 1A.

FIGS. 1A and 1B show two orthographic views (side and top, respectively) of a high speed planing apparatus 10. The apparatus 10 has a table 12 for supporting an article of wood 14 that travels horizontally on the table. At least four planer heads 16 are provided: one (16a) above the article of wood (hereinafter "top"), one (16b) below the article of wood (hereinafter "bottom"), one (16c) to one side of the article of wood and one (16d) to the other side of the article of wood (hereinafter "side"). Each planer head rotates about a respective axis of rotation "Ra," "Rb," "Rc," and Rd." As a result of this rotation, in conjunction with travel of the wood 14 relative to the planer heads, each planer head cuts a corresponding surface on the article of wood, so that a top surface, a bottom surface, and two opposing side surfaces are cut. An object of this process is to produce a surface having a high surface quality; however, it is not essential that the planing apparatus be used to produce a finished surface.

Figure 2:
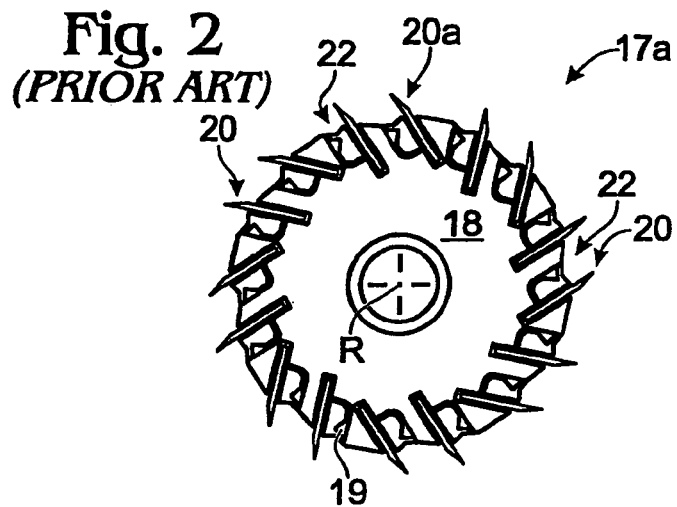
FIG. 2 is an end view of a prior art planer head for use in the apparatus of FIGS. 1A and 1B.
Figure 3:
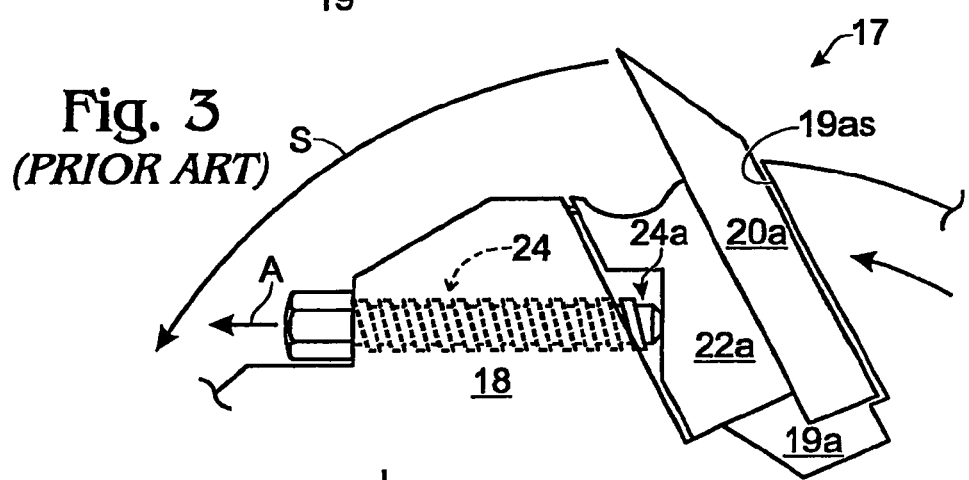
FIG. 3 is more detailed end view of the planer head of FIG. 2.

FIG. 2 shows an end view of one (17a) of the planer heads 16. The head 17a has an axis of rotation "R." A hub 18 of the head 17a carries a plurality of circumferentially spaced apart knives 20 and associated gibs 22 in corresponding pockets 19 of the hub. FIG. 3 shows one of the pockets 19a in more detail. A knife 20a and its associated gib 22a are disposed in the pocket 19a. A screw 24 is threadably received through a hole in the hub 18 and a terminating end 24a thereof extends outside the hub and bears against the gib 22a which, in turn, bears against the knife 20a. This clamping force clamps the knife against a supporting wall 19 as of the pocket 19a. A minimum circumferential spacing "S" is required between adjacent knives to provide space for accessing and removing the screw 24a in the direction of the arrow "A."

Figure 4B:
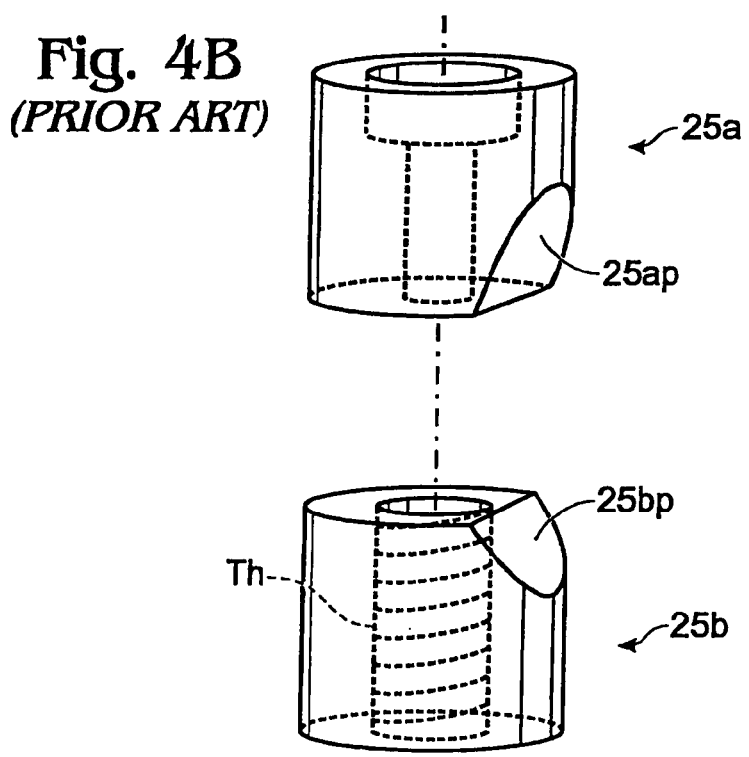
FIG. 4B is a pictorial view of two collars used in the planer head of FIG. 4A.
Figure 4A:
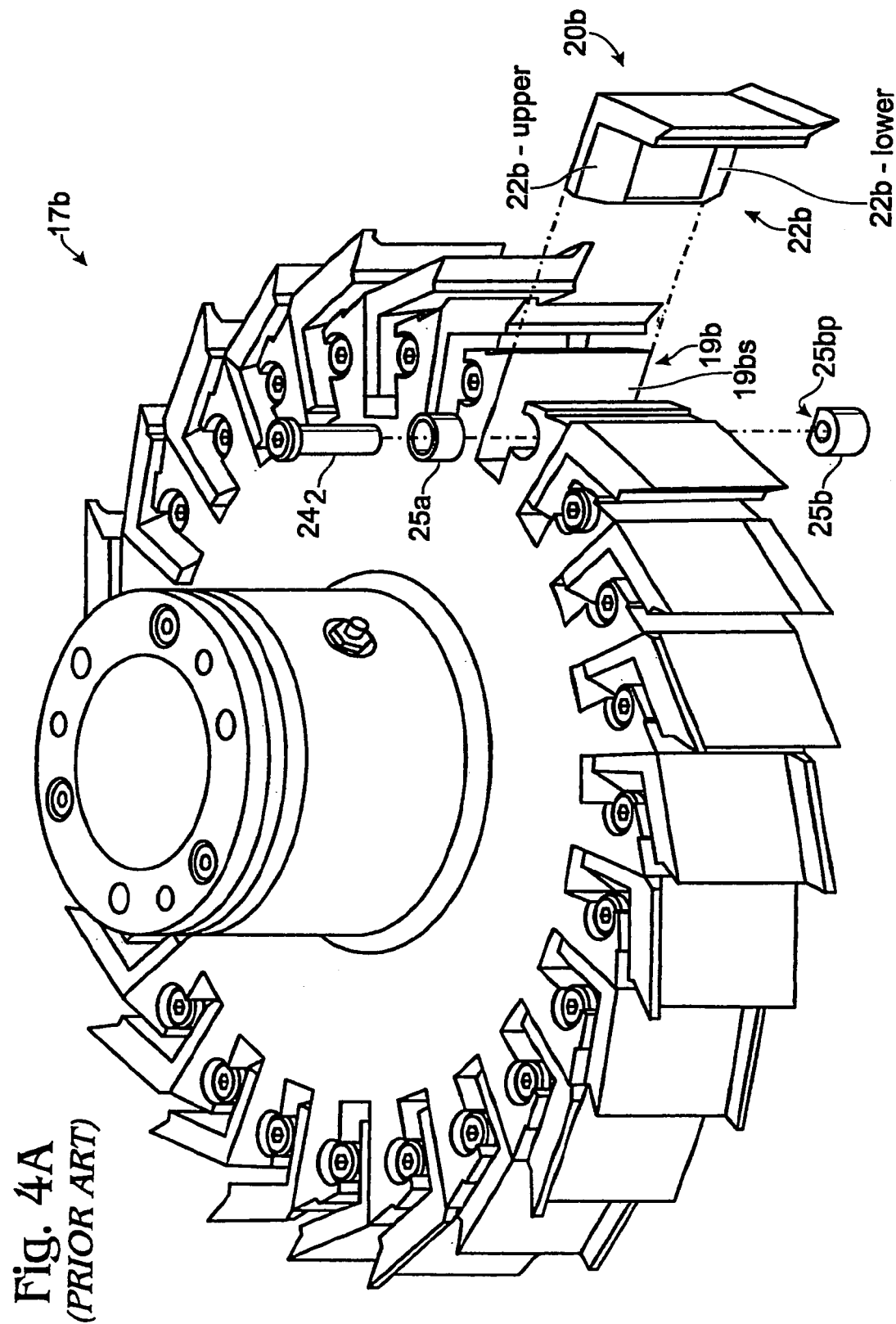
FIG. 4A is a pictorial view of an alternative prior art planer head.

FIG. 4a is a pictorial view of an alternative prior art planer head 17b, showing a knife 20b removed therefrom. The knife 20b is clamped in a pocket 19b in the head 17b by an axially directed screw $24_2$ extending through an upper collar 25a and into a corresponding lower collar 25b. Referring in addition to FIG. 4B, the collars 25 include corresponding ramped planar portions 25ap (not visible in FIG. 4A) and 25bp for mating with corresponding ramped planar portions 22b-upper and 22b-lower of a gib portion 22b of the knife 20b that functions analogously to the gib 22a of the knife 20a. Rather than bearing against the knife as does the gib 22a, the gib portion 22b is integrally attached to the knife and supports the knife, which is cantilevered therefrom. Therefore, the gib portion 22b must be particularly large and robust to withstand the required forces, as compared to the gib 22a.

One of the collars (25a) is adapted to receive the head of the screw $24_2$ and the other collar (25b) includes threads "Th" adapted to receive the threads of the screw. Inserting the screw through the collar 25a and tightening the screw into the collar 25b forces the collars together, wedging the collars against the ramped planar portions of the knife and thereby forcing the knife against a back surface $19b_s$ of the pocket 19b, to clamp the knife to the planer head. This construction provides an advantage over the planer head 17a described immediately above in providing the capability to move the knives closer to one another and therefore achieve denser knife spacing. However, this density is limited by the dimensions of the collars and the gib portions 22b, all of which must be robustly sized in order to withstand the required forces.

Figure 5:
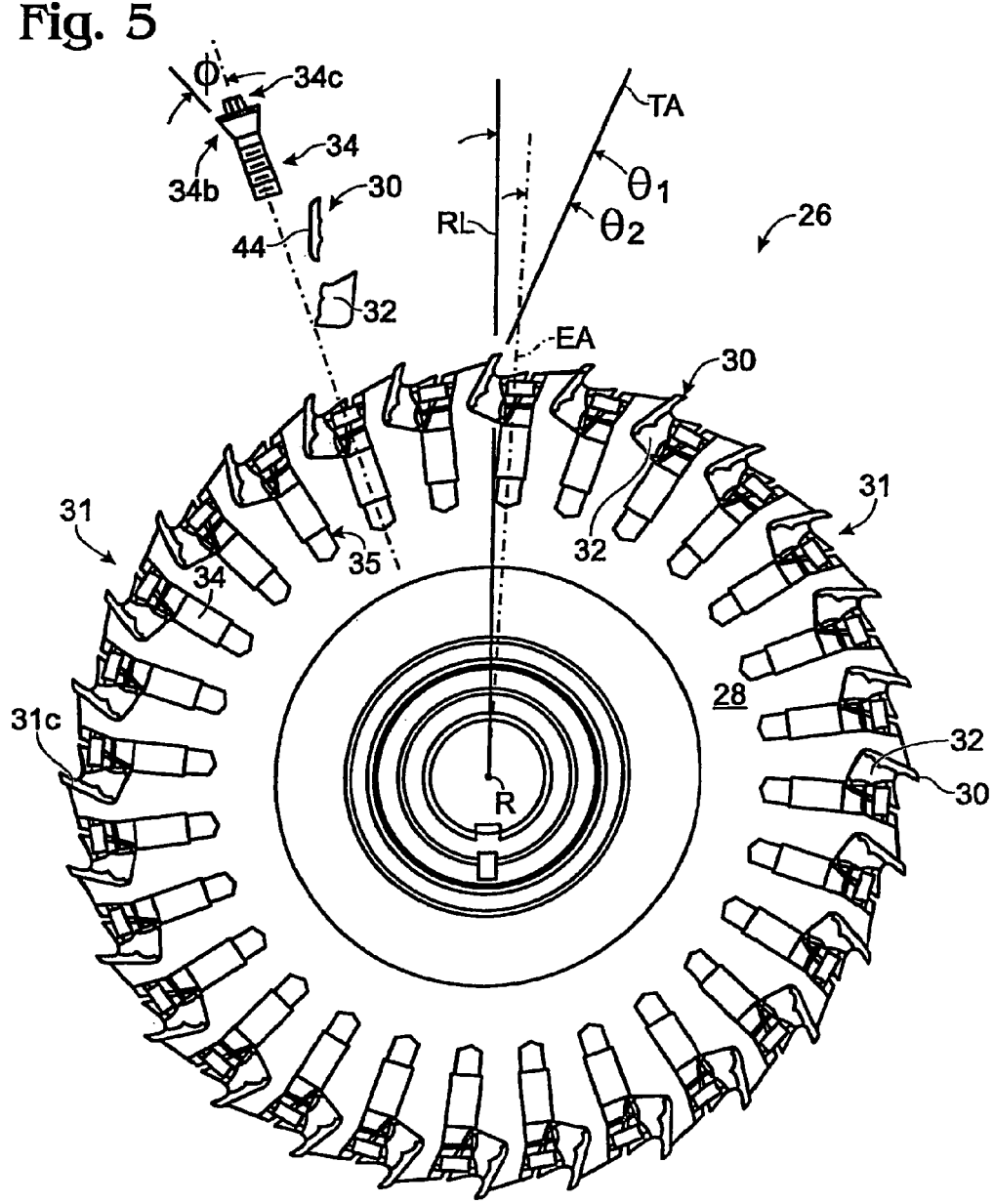
FIG. 5 is an end view of a face-cutting planer head according to the present invention.
Figure 6:
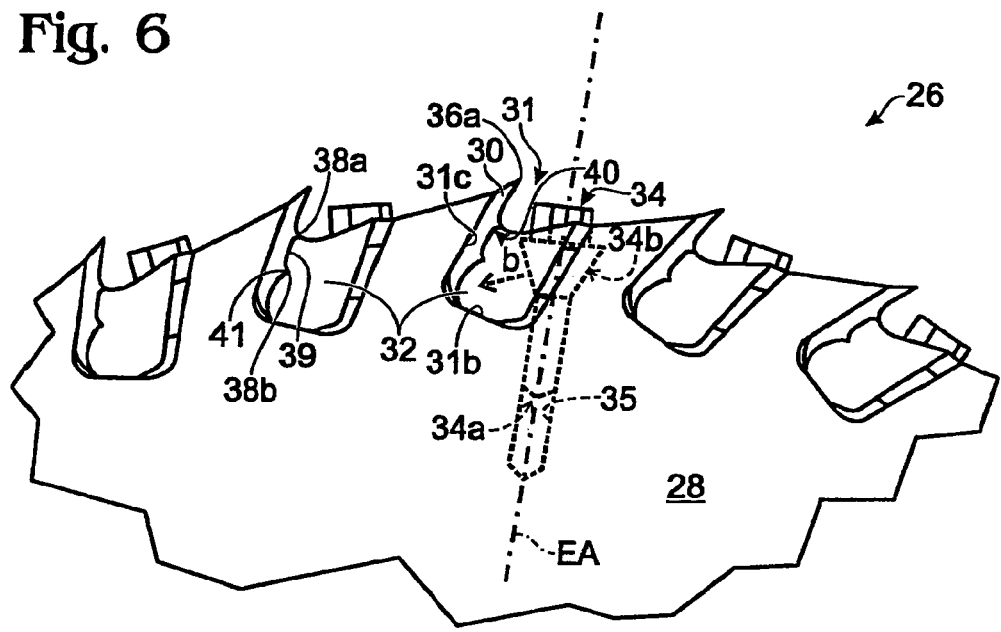
FIG. 6 is more detailed end view of the planer head of FIG. 5.

Turning to FIG. 5, an end view of a face-cutting planer head 26 according to the present invention is shown. A hub 28 of the head 26 carries a plurality of circumferentially spaced apart knives 30. Each knife 30 is disposed in an associated pocket 31 and has an associated gib 32. As best seen in FIG. 6, showing a portion of the periphery of the hub 28 in greater detail, a screw 34 has a threaded portion for threading into a hole 35 in the hub. The threaded portion terminates in a terminating end 34a that is, preferably, contained within the hub and, in any event, is not used to exert a force on either the gib or the knife. Rather, the screw 34 according to the present invention has a ramping shoulder portion 34b which in a preferred embodiment of the invention is of frustoconical shape. The ramping portion 34b exerts increasing wedging force (in the direction indicated by the arrow "b") against the gib 32 as the screw is tightened, the gib in turn transmitting this wedging force against the knife, to clamp the knife in place against a supporting wall 31c of the pocket 31, and against the gib, to force the gib against a front side 40 of the knife and a bottom 31b of the pocket 31. The screw 34 is shown with a male tightening member 34c; however, a female tightening member may also be used. Moreover, a female tightening member has been determined not to become loaded with wood waste during operation and the female configuration provides for greater clearance and so may, therefore, be preferable.

An angle Θ defines the ramp angle of the of the ramping portion 34b of the screw 34. This ramp angle provides a mechanical advantage in translating a tightening force applied to thread the screw into the hole 35 into a clamping force bearing against the gib and, in turn, the knife. A small ramp angle Θ increases the advantage; however, if the ramp angle Θ is too small, too little range of movement of the gib will be provided to accommodate manufacturing tolerances between the screw, gib and knife, along with the additional elastic compression of the parts necessary to exert the required clamping force. It has been found that the ramp angle Θ is preferably in the range of about 10-25 degrees.

The combination of the screw 34 and gib 32 clamp each knife 30 in the planer head 26. The gib 32 need be no more robust than the gib 22a described above in connection with the head 17a. The screw 34 in essentially incorporating the function of the collars 25 of the head 17b can be of smaller overall dimensions than the corresponding screw and collar combination, and the gib 32 need not be as strong and therefore may be smaller and, particularly, thinner than the corresponding gib portion 22b. Thence, the screw and gib according to the present invention provide minimum sized components for clamping knives in a planer head, providing for maximum density of spacing of the knives and, therefore, a maximum degree or quality of surface finish.

Figure 7:
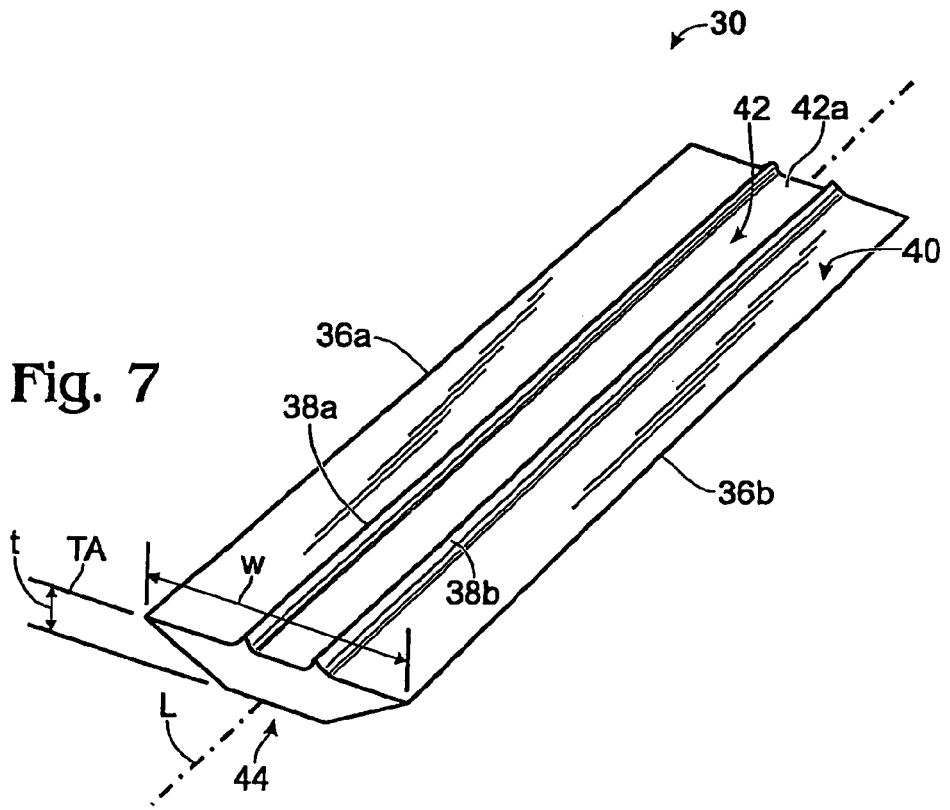
FIG. 7 is a pictorial view of a preferred knife for use in the planer head of FIG. 5.

Referring to FIG. 7, the knives 30 are preferably provided with dual, opposed, cutting edges 36a and 36b and corresponding deflector ridges 38a and 38b such as described in Schmatjen, U.S. Pat. No. 5,819,826 that project from the front side 40 of the knife and extend parallel to an elongate axis "L" of the knife. The deflector ridges define a channel 42 having a channel surface 42a. The channel 42 is effectively a recess in the front side of the knife, which may be provided in other configurations, such as a keyway. The knives 30 also have a back surface 44 that is received against the supporting wall 31c of the pocket 31.

The recess provided, in the preferred embodiment, by the deflector ridges 38 and the associated channel 42 define an interlocking feature adapted for interlocking with the gib 32, providing a double-sided, indexable knife system that securely and positively holds the knife in the associated pocket. Particularly, as seen in FIG. 6, for use with the preferred knife 30, the gib is adapted so that one of the deflector ridges 38a is disposed outside a toe 39 of the gib at one end of the toe, the other end of the toe being defined by a recess 41 shaped to receive the other deflector ridge 38b. The channel 42 as bounded by the deflector ridges defines a recess that, along with the relatively projecting toe of the gib 32, provide interlocking means which cooperate to index and further securely hold the knife 30 in position against the gib 32.

Referring back to FIG. 7, the knife 30 has an elongate axis "L" and, a line perpendicular to the elongate axis "L" and passing through the cutting edges 36 of the knife defines a transverse axis "TA" of the knife. Now referring back to FIG. 5, the gib 32 associated with the pocket wall 31c defines an orientation of the axis "TA" for the knife as installed in the hub 28. This orientation can be specified as an angle $\theta_1$ relative to a radial line "RL" extending through the axis of rotation "R" of the head. The angle $\theta_1$ establishes the axis "TA." The angle $\theta_1$ is optimized to provide a desired angle of attack for the knife and is preferably in the range of 10-30 degrees.

The hole 35 for receiving the threaded portion of the screw 34 has an elongate axis "EA" that makes an angle $\theta_2$ relative to the radial line "EA." The angle $\theta_2$ is optimized to direct the clamping force against the knife. The angle $\theta_2$ is preferably in the range of 10-20 degrees and is determined without regard to the angle $\theta_1$, i.e., the axes "EA" and "TA" rotate together as the angle $\theta_1$ is varied.

The planer head 26 provides several outstanding advantages. One advantage is that the manner described above for clamping each knife 30 provides for much denser spacing of the knives as compared to the prior art. The screw 34 may be accessed and removed from essentially a radial direction rather than a circumferential direction, so that the spacing between the knives need not provide space for screw access or removal as was required in the prior art. This denser spacing of the knives, by itself, improves surface finish. Moreover, this improved surface finish can be traded off, to any extent desired, to achieve higher production throughput by increasing the speed of travel of the wood being cut.

The mechanical advantage provided by the screw 34 has been found to decrease the number of screws required to achieve a given clamping force. This provides for less machine downtime, since fewer screws need to be loosened or removed in order to remove a knife for replacement or repair. This mechanical advantage also makes the screw less prone to loosening, so that clamping is made more secure.

It is also recognized by the present inventor that each of the knives 30 may be made very thin (dimension "t" in FIG. 7), so that, from material considerations, it becomes economical to dispose of the knives rather than repair them. For example, for a typical knife that is ⅞" wide (dimension "w" in FIG. 7) and arbitrarily long (e.g., anywhere from 1" to 48"), a representative dimension "t" is only 0.082". Employing disposable knives further reduces machine downtime as well as the cost of providing and operating machines used for knife repair. The ability to make the knives thin is due, at least in part, to the security of the clamping force provided by the screw 34 as well as the indexing provided by the deflector ridges.

The knives 30 and the gibs 32 need not extend the entire (axial) length of the hub 28. For example, two knives 30 and/or two associated gibs 32, axially butted against one another, are preferably used in each pocket 31, each pair of a knife and associated gib extending about half the axial length "l" of the hub. Two axially disposed knives and/or two axially disposed gibs, or more than two axially disposed knives and/or more than two axially disposed gibs may be provided in each pocket without departing from the principles of the invention.

Figure 8A:
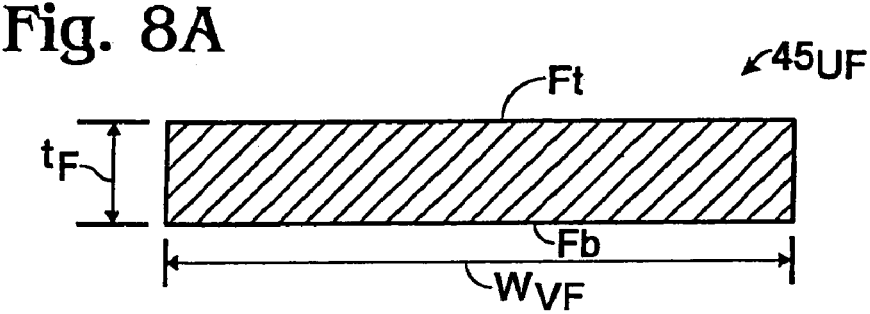
FIG. 8A is a cross-sectional view of an unfinished article of lumber.

The just described planer head 26 corresponds to two of the four planer heads 16a-16d of FIGS. 1A and 1B. Turning to FIG. 8A, a generalized cross-section of a length of unfinished construction lumber $45_{UF}$ is shown. Two of the planer heads 26 are arranged in correspondence to the heads 16a and 16b of FIGS. 1A and 1B and cut, respectively, top and bottom faces $F_t$ and $F_b$ of the lumber $45_{UF}$. After this cutting the lumber has a finished thickness "$t_F$," and an unfinished width "$w_{uf}$."

Figure 8B:
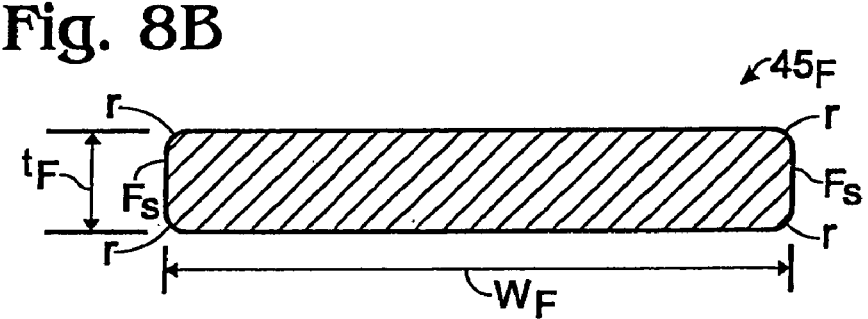
FIG. 8B is a cross-sectional view of the article of lumber of FIG. 8A in a finished condition.

FIG. 8B shows a cross-section of the article of lumber shown in FIG. 7A in a finished condition $45_F$ as a result of cutting two side faces $F_s$, along with four respective radiused corners "r," with planer heads corresponding to 16c and 16d of FIGS. 1A and 1B. Accordingly, each of the side-cutting planer heads has corner-cutting adaptations for cutting two radiused corners "r" in addition to an adaptation for face-cutting a flat side face $F_s$.

Figure 9A:
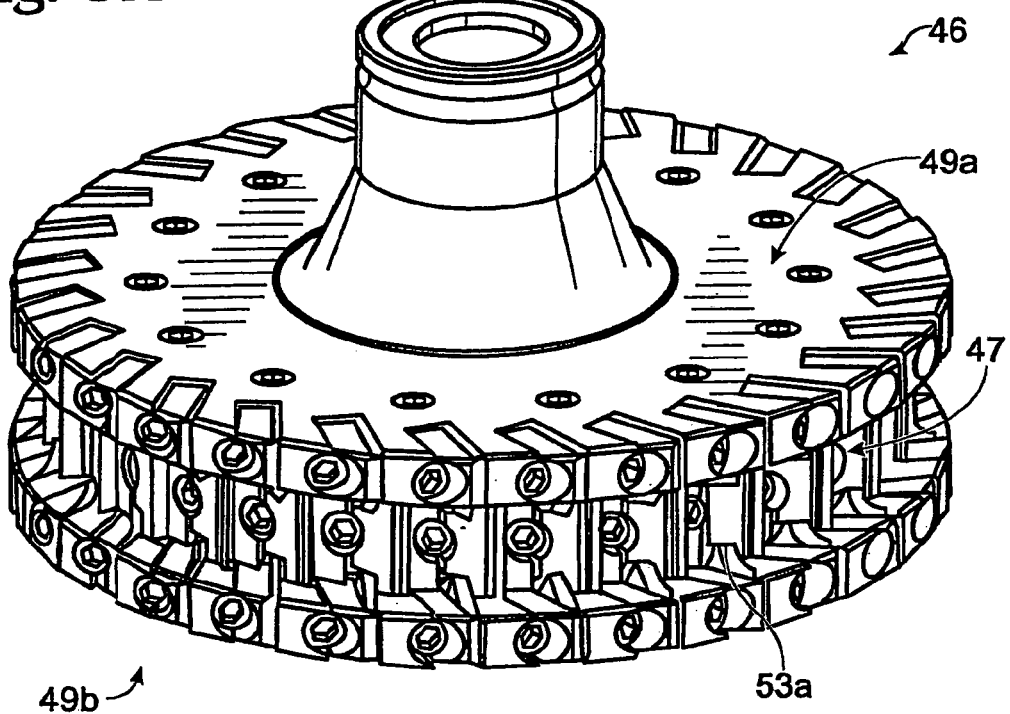
FIG. 9A is a pictorial view of side-cutting planer head according to the present invention.
Figure 9B:
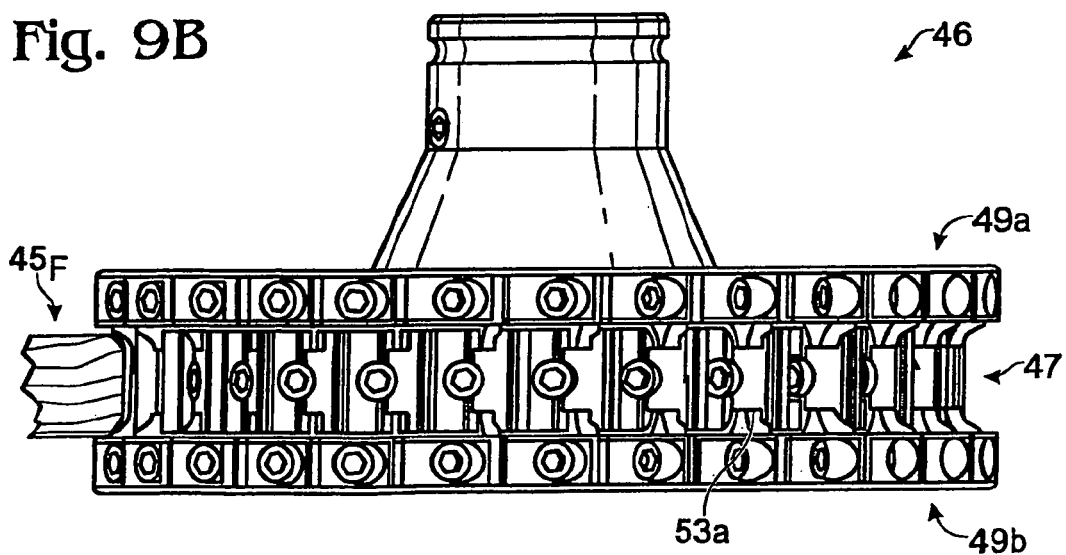
FIG. 9B is a side elevation of the planer head of FIG. 8A.

Turning to FIGS. 9A and 9B, a side-cutting planer head 46 is shown having the corner and face-cutting adaptations just indicated. Particularly, the side-cutting planer head 46 has a face-cutting center portion 47 and two corner-cutting end portions 49, namely 49a and 49b, on either side of the center portion 47, for cutting respective radiused corners "r." The portions may be attached to a shaft for rotating the portions as is known in the art or may be formed integrally with the shaft.

Turning to FIG. 10, the face-cutting center portion 47 includes a hub 48 carrying a plurality of circumferentially spaced apart knives 50. Each knife 50 is disposed in an associated pocket 51 and has an associated gib 52. A screw 54 is threadably received through the hub 48. The screw 54 preferably has the same features as the screw 34 for wedging against the gib 52, and in turn for wedging the knife against a supporting wall 51c of the pocket 51. As the center portion 47 is used to cut a flat face like the planer head 26 described above, the center portion is preferably provided with all of the features of the planer head 26.

With reference to FIGS. 10 and 11, each corner-cutting end portion 49 includes a hub 58 (58a, 58b in FIG. 10) carrying a plurality of circumferentially spaced apart knives 60. Each knife 60 is disposed in an associated pocket 61 and has an associated gib 62. A screw 64 is threadably received through the hub. The screw 64 preferably has a ramping shoulder portion 64b that is the same as or similar to the ramping shoulder portion 34b of the screw 34, for wedging against the gib 62, and in turn for wedging the knife against a supporting wall 61c of the pocket 61. The screw 64 is shown with a female tightening member 64c; however, as mentioned above, either female or male tightening member may be used.

Figure 12A:
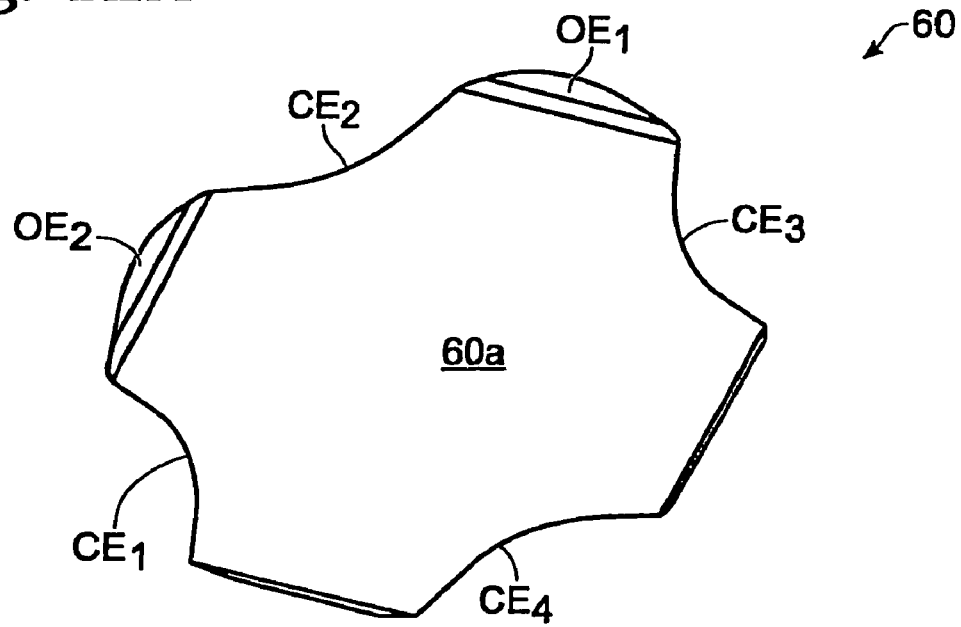
FIG. 12A is a pictorial view of a front side of a corner-cutting knife according to the present invention for use in end portions of the planer head of FIG. 9A.
Figure 12B:
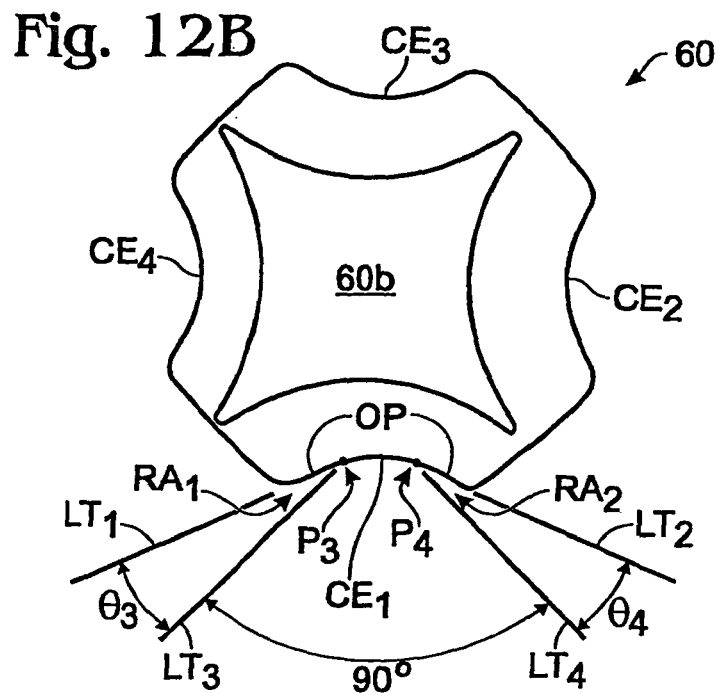
FIG. 12B is a pictorial view of a back side of the knife of FIG. 12A.

As best seen in FIG. 9B, the corner-cutting end portions 49 (49a, 49b) are adapted to cut two of the radiused corners "r" shown in FIG. 8B. Turning to FIGS. 12A and 12B, showing the knife 60 in more detail, the knife has at least one corner-cutting edge "$CE_1$" for this purpose. It is advantageous, however, to provide the knife 60 with four corner-cutting edges "$CE_1$," "$CE_2$," "$CE_3$," and "$CE_4$," so that the knife carries a multitude of replacement edges and so that a symmetry is provided in the knife so that the knife is suitable for use in either end portion 49. However, any number of corner-cutting edges (or cutting edges) may be provided. Preferably, the four corner-cutting edges are disposed with respect to one another with 90 degree rotational symmetry as shown; generally, it is preferable to provide "n" cutting edges with 360/n degree rotational symmetry.

The knife 60 has a front side 60a (FIG. 12A) and a back side 60b (FIG. 12B). Taking the end portion 49a for example and with reference to FIG. 9, to expose the corner-cutting edge "$CE_1$," the knife is indexed to the pocket 61 by seating a first outer edge "$OE_1$" against a bottom supporting wall 61b in the hub 58a. A second outer edge "$OE_2$" is index to a sidewall 53a (see also FIGS. 9A and 9B) of a pocket 53 in the adjacent hub 48 of the center portion 47. Similar considerations apply in mirror image for the end portion 49b.

With particular reference to FIG. 12B, the cutting edge "CE" is a portion of a concavely circular arc for cutting a round (radiused) corner "r," though other shapes could be used for forming corners having different configurations. A full 90 degree arc, necessary for cutting a complete ¼ round corner "r," is shown superimposed on the cutting edge "$CE_1$." The 90 degree arc terminates at end-points $P_3$ and $P_4$. $P_2$. Lines "$LT_3$" and "$LT_4$" that intersect the end-points $P_3$ and $P_4$ are spaced apart 90 degrees.

By contrast, the cutting edge "$CE_1$" is preferably less than a full 90 degree arc and terminates at end-points $P_1$ and $P_2$. Lines "$LT_1$" and "$LT_2$" that intersect the end-points $P_1$ and $P_2$ are spaced apart greater than 90 degrees. Particularly, respective alignment relief areas "$RA_1$" and "$RA_2$" are defined between the respective lines "$LT_1$" and "$LT_2$" and the corresponding lines "$LT_3$" and "$LT_4$." These alignment relief areas (or "alignment reliefs") are preferably formed by employing, preferably though not necessarily, straight outer perimeter sections "OP" flanking, on each side, the cutting edge "$CE_1$." An alignment relief angle $\theta_3$ corresponding to the alignment relief area "$RA_1$" and an alignment relief angle $\theta_4$ corresponding to the alignment relief area "$RA_2$" are preferably equal to each other and are preferably about 20 degrees; however, the angles can vary depending on need according to the following considerations.

The alignment reliefs are provided to ensure that the knife does not extend into space in which it is not desired as a result of misalignment of the knives. Even if the knives are originally perfectly aligned, such misalignment can subsequently occur, for example, as a result of the process known in the art as "jointing," which is used to sharpen the knives in a planer head with a stone, while the knives remain clamped to the apparatus. Referring to FIGS. 9A and 9B for context, the stone (not shown) contacts the cutting edges of the knife 50 of the center portion 47 and the cutting edges of the knives 60 of the end portions 49 at the same time, and it is highly desirable that the stone be applied to the same thickness of metal for all cutting edges, to provide for even sharpening. However, if the outer perimeter sections of the knives 60 extended along the lines "$LT_3$" and "$LT_4$," and if the knives 60 were not perfectly aligned or oriented with respect to the knives 50, portions of the knives 60 would project into space adjacent to that occupied by portions of the knives 50, "doubling-up" on the amount of metal confronted by the stone at such locations.

Figure 13A:
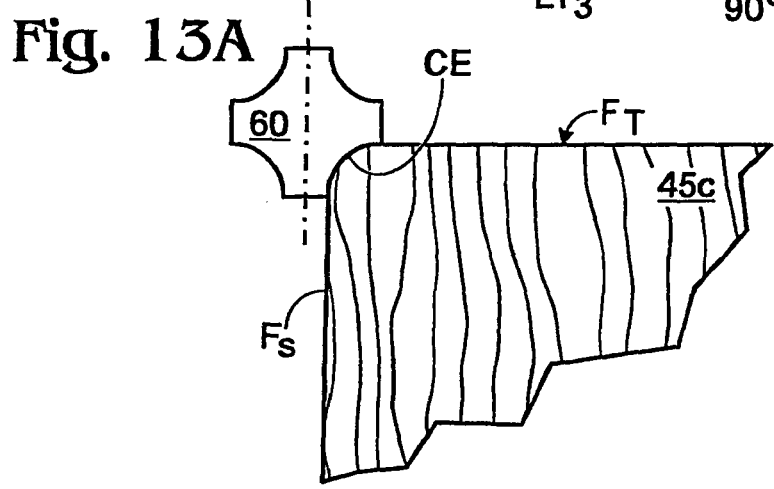
FIG. 13A is a cross-sectional schematic view of an article of lumber being cut with a corner-cutting knife having a full ¼ round cutting edge in perfect alignment.
Figure 13B:
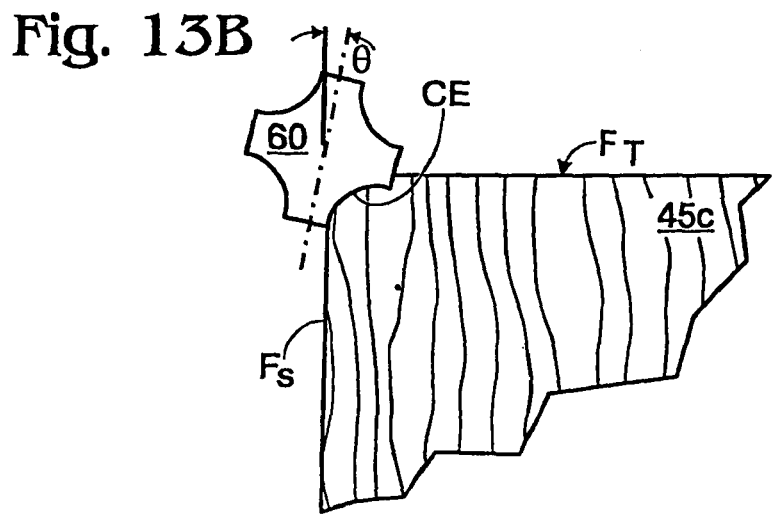
FIG. 13B is a cross-sectional schematic view of the article of lumber of FIG. 12A cut with the knife of FIG. 13A in imperfect alignment.

As another consideration, the alignment reliefs prevent potential interference between the corner-cutting knife 60 and an adjacent face-cutting knife. An example is shown in FIGS. 13A and 13B. FIG. 13A shows a corner portion (in cross-section) of an article of lumber 45c. A top face "$F_T$" is cut with a face-cutting planer head (not shown) such as the planer head 26, while a side face "$F_s$" is cut with the face-cutting center portion 47 of planer head (also not shown) adapted for corner cutting such as the planer head 46. A corner-cutting end-portion 49 (also not shown) of the planer head carries a knife 60 having a cutting edge "CE." As shown, the cutting edge "CE" is a full ¼ round and is perfectly aligned with respect to the top face "$F_T$;" however, this is not a practical circumstance.

Turning to FIG. 13B, if the knife 60 is misaligned by any angle θ that is greater than zero, the cutting edge CE will cut into the top face "$F_T$" regardless of whether the top face is cut before or after the side face "$F_S$." If the knife is misaligned in the opposite direction, a similar interference will occur with the side face "$F_S$."

The knives 50 and screws 54 of the center portion 47 of the planer head 46 are preferably oriented as shown in FIG. 10. Referring to FIG. 11, the gib 62 associated with the pocket wall 61c defines an orientation of an axis "$TA_a$" in the plane of the back surface 60a (FIG. 12A) of the knife 60 as installed in the hub 58. This orientation can be specified as an angle $\theta_{1a}$ relative to a radial line "$RL_a$" extending through the axis of rotation "R" of the head. The angle $\theta_{1a}$ establishes the axis "$TA_a$." The angle $\theta_{1a}$ is optimized to provide a desired angle of attack for the knife and is preferably in the range of 10-30 degrees.

A hole 65 for receiving the threaded portion of the screw 34 has an elongate axis "$EA_a$" that makes an angle $\theta_{2a}$ relative to the radial line "$EA_a$." The angle $\theta_{2a}$ is optimized to direct the clamping force against the knife. The angle $\theta_{2a}$ is preferably in the range of 0-20 degrees and is determined without regard to the angle $\theta_{1a}$, i.e., the axes "$EA_a$" and "$TA_a$" rotate together as the angle $\theta_{1a}$ is varied.

The prior art typically provided a single knife having a straight cutting edge integrally formed with one (or two) curved cutting edges, to cut both the side face $F_s$ and one (or two) of the corners r of the article of lumber $45_F$ in FIG. 8B. The novel construction of the present invention provides a number of outstanding advantages over the prior art. For example, to change the radius of the finished lumber, all that is required according to the invention is to change the relatively small and inexpensive corner-cutting knives 60, while in the prior art, the entire cutting surface needed to be changed.

Moreover, the prior art planer head was adapted for a particular knife. Turning back to FIG. 10, the center and end portions according to the present invention are preferably provided as separate units that are bolted together as shown. Although this feature is not essential and the end portions may be manufactured integrally, the feature provides for changing the width of the finished lumber simply by changing out the center portion 47, while in the prior art, the entire planer head would need to be changed.

According to another aspect of the invention, and taking advantage of the preferred "bolt-together" construction of the planer head 46 shown in FIG. 10, the planer head can be adjusted from being adapted to cut dry lumber to being adapted to cut green lumber, and the reverse, simply by changing the knives 60 and the end portions 49.

Figure 14A:
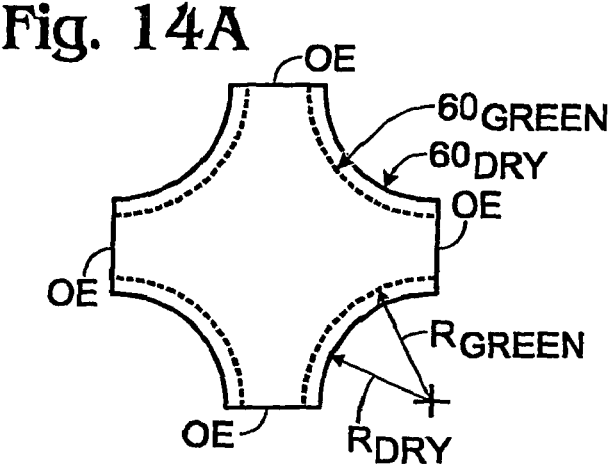
FIG. 14A is a plan view of two knives according to the present invention, comparing dimensions thereof for cutting an article of lumber from dry and green stock.

FIG. 14A shows the outline of a representative knife $60_{DRY}$, corresponding to the configuration shown in FIG. 12A, for cutting an article of lumber of nominal size from stock that has been kiln dried. The cutting edges $CE_{DRY}$ have respective radii $R_{DRY}$. Shown in dotted line is the outline of a corresponding knife $60_{GREEN}$ having larger respective radii $R_{GREEN}$ adapted for cutting the same article of lumber from green stock.

Figure 14B:
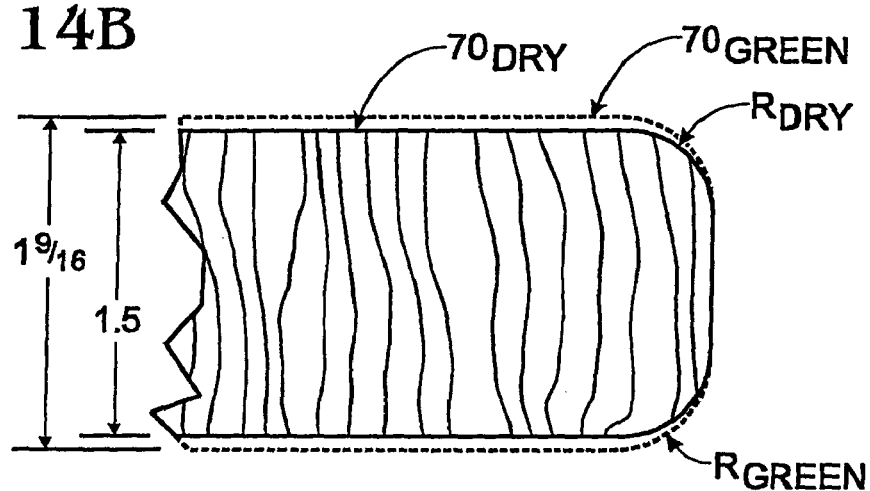
FIG. 14B is an end view of an article of lumber shown with finished corners produced by the two knives of FIG. 14A.

FIG. 14B shows an of a finished 2×4 $70_{DRY}$ finished from dry stock, corresponding to the outline shown for the article $45_F$ in FIG. 9B, along with the corresponding outline of a 2×4 $70_{GREEN}$ finished from green stock shown in dotted line. The widths of the two articles differ slightly, typically by the dimensions indicated, and the radii of the respective corners $R_{DRY}$ and $R_{GREEN}$ differ as shown FIG. 14A.

Figure 14C:
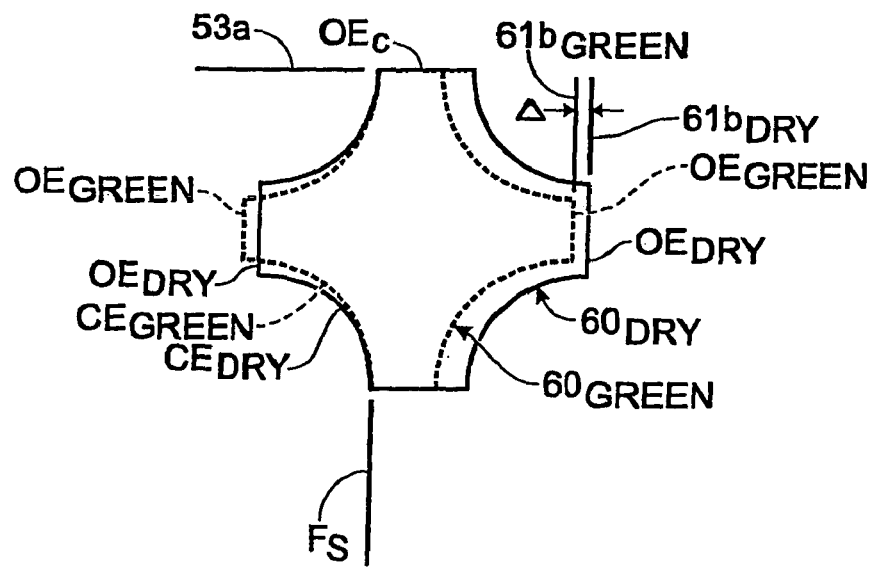
FIG. 14C is a plan view of a positioning, according to the present invention, of the two knives of FIG. 14A for finishing the article of lumber as shown in FIG. 14B.

With additional reference to FIG. 10, it is recognized that to leave the outer edges OE (FIG. 14A) of the knives 60 available for indexing to the center portion 47 (particularly, the sidewall 53a) as described above, the knives $60_{DRY}$ and $60_{GREEN}$ can be shifted relative to one another as shown in FIG. 14C (compare with FIG. 14A). Outer edges OE of both knives remain positioned to contact the sidewall 53a (FIG. 10) of the center portion 47, so that the same center portion can be used. Outer edges $OE_{DRY}$ and $OE_{GREEN}$ are shifted relative to one another, and this shift can be accommodated by modification of the end portions 49.

For example, to cut 2×4's from dry stock, the knife $60_{DRY}$ has the position shown in FIG. 14C: A cutting edge $CE_{DRY}$ merges or aligns with the face side $F_s$ of the 2×4; the knife $60_{DRY}$ is indexed to the sidewall 53a of the center portion 47 at the outer edge $OE_C$; the knife $60_{DRY}$ is indexed to the bottom supporting wall 61b of the pocket 61 of the end portion 49 (49a in FIGS. 9B and 10) at the outer edge $OE_{DRY}$. Similarly, to cut 2×4's from green stock, the knife $60_{GREEN}$ has the position shown in FIG. 14C. A cutting edge $CE_{GREEN}$ merges or aligns with the face side $F_s$ of the 2×4, the knife $60_{GREEN}$ is indexed to the sidewall 53a at the outer edge $OE_C$, and is indexed to the bottom supporting wall 61b at the outer edge $OE_{GREEN}$. The outer edges $OE_{DRY}$ and $OE_{GREEN}$ are displaced an amount Δ from one another that is equal to ½ the difference in the widths shown in FIG. 14B, and the respective depths of the pockets 61 of end portions 49 corresponding to the two knives are provided accordingly.

Preferably, the pockets 61 are identical for end portions adapted for the two types of wood stock, and the depths of the pockets are adjusted simply by changing the outer diameter "D" of the end portion (see FIG. 10), though this is not essential. In any event, to change from cutting green lumber to dry lumber or the reverse, or to change the width of the article of lumber a small amount for any other reason, only the knives 60 and the end portions 49 need to be changed; the more expensive center portion 47 may be used for either purpose and therefore may remain in the cutting apparatus.

Figure 15A:
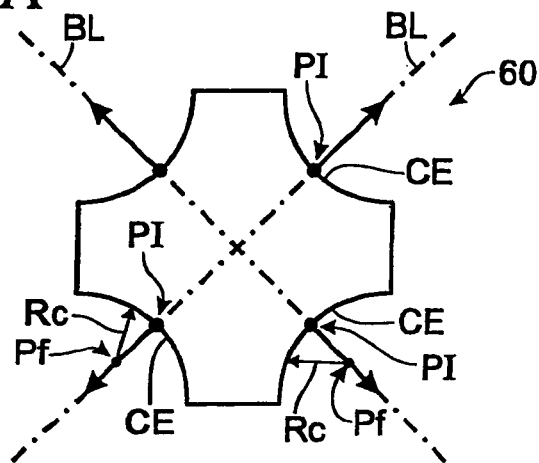
FIG. 15A is a schematic view of the knife of FIGS. 12A and 12B showing geometric constructions useful for defining the configuration of the knife according to the present invention.
Figure 15B:
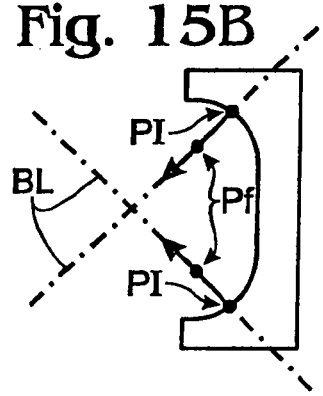
FIG. 15B is a schematic view of a prior art knife corresponding to the schematic view of FIG. 15A.

Turning to FIG. 15A, the knife 60 has a distinct configuration that can be defined with reference to lines "BL" that bisect the cutting edges CE of the knife. Each cutting edge CE is preferably semi-circular as described above and, therefore, has a radius of curvature Rc that is constant. The radii of curvature extend from respective focal points Pf that lie on the lines BL. The lines BL intersect the cutting edges at respective points PI, and vectors extending along the lines BL in the direction from the points PI to the points Pf diverge from another as shown, i.e., they do not cross one another. FIG. 15B provides a comparison with a prior art knife having two curvilinear cutting edges. The same principles can apply to distinguish knives 60 having more complex curvilinear shapes for the cutting edges.

Figure 16A:
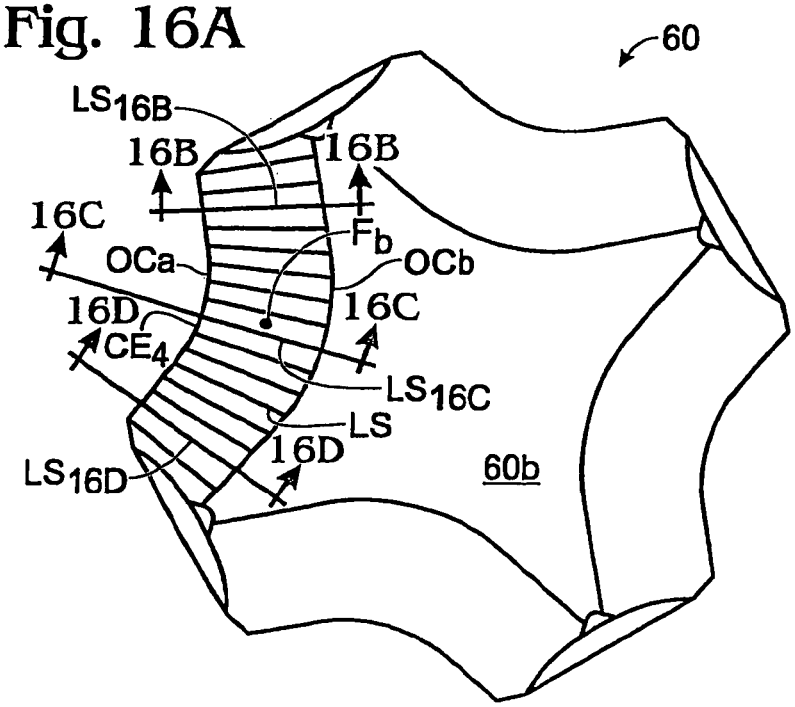
FIG. 16A is a pictorial view of the knife shown in FIGS. 12A and 12B showing line segments used to describe the shape of a beveled surface of the knife according to the present invention.
Figure 16B:
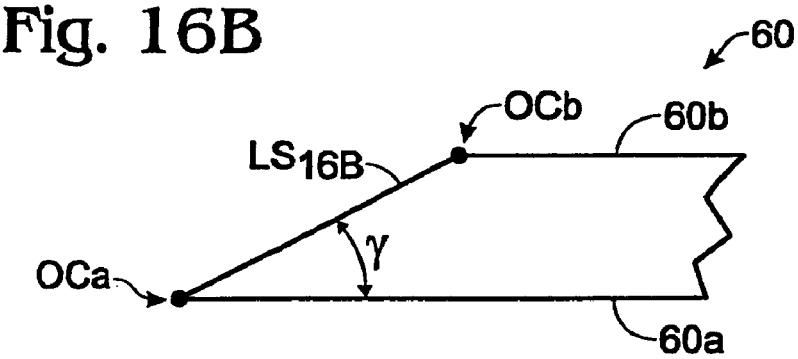
FIG. 16B is a partially cut-away cross-sectional view of the knife of FIG. 16A taken along a line 16B-16B thereof.
Figure 16C:
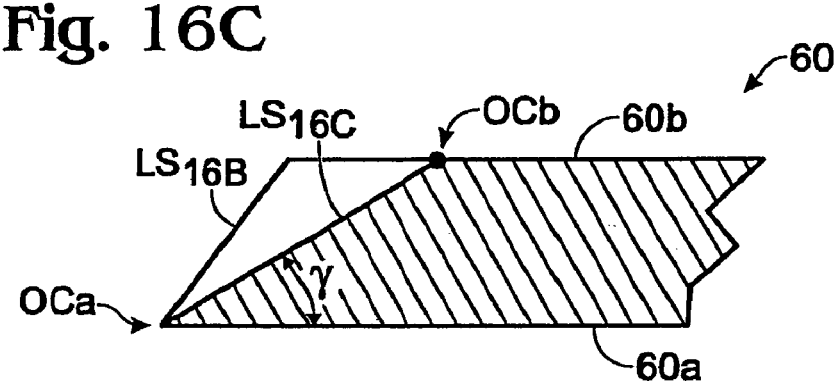
FIG. 16C is a partially cut-away cross-sectional view of the knife of FIG. 16A taken along a line 16C-16C thereof.

FIGS. 16A-16C illustrate another aspect of the knife 60 according to the present invention. As seen in FIG. 16A, a number of line segments "LS" are shown on a beveled face "Fb" that includes the cutting edge $CE_4$ shown in FIG. 12B. The line segments "LS" are lines perpendicular to both an outer peripheral contour "OCa" that defines a periphery of the front surface 60a of the knife (not visible in FIG. 16A—see FIG. 12A) that includes the cutting edge "$CE_4$" and a corresponding, parallel outer peripheral contour "OCb" that defines a periphery of the back surface 60b of the knife. The line segments "LS" are therefore of minimum length for connecting the two outer contours. As the line segments "LS" are geometric constructions rather than distinct physical features, there are an infinite number of the line segments "LS" defining the beveled face "Fb."

Figure 16D:
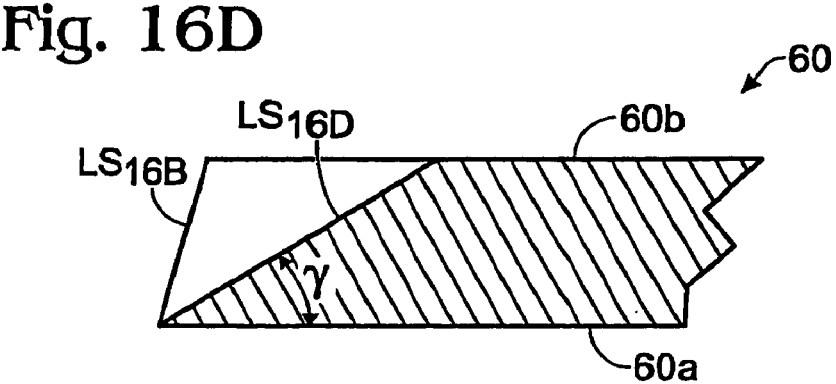
FIG. 16D is a partially cut-away cross-sectional view of the knife of FIG. 16A taken along a line 16D-16D thereof.

FIGS. 16B - 16D are cross-sections of the knife 60. Each cross-section is taken in a plane perpendicular to (a) the front surface 60a, (b) the parallel back surface 60b, and (c) the respective outer contours "OCa" and "OCb," and includes one of the line segments "LS." Particularly, FIG. 16B illustrates the cross-section indicated in FIG. 16A that includes the line Segment "$LS_{16B}$," FIG. 16C illustrates the cross-section indicated in FIG. 16A that includes the line segment "$LS_{16C}$" and FIG. 16D illustrates the cross-section indicated in FIG. 16A that includes the line segment "$LS_{16D}$."

Each of these line segments is angled, as are all of the line segments "LS," with respect to the plane of the front side 60a of the knife, by a substantially fixed angle γ that is preferably in the range of 25-40 degrees. The angle γ is referred to herein as an "attack relief angle" to distinguish it from the alignment relief angle described earlier. As can be seen in FIG. 16B for example, the attack relief angle γ is defined between the line segments LS and the undersurface 60a (FIG. 12A) of the knife. For reference purposes, the attack relief angle γ is also indicated in FIG. 17A.

Figure 17A:
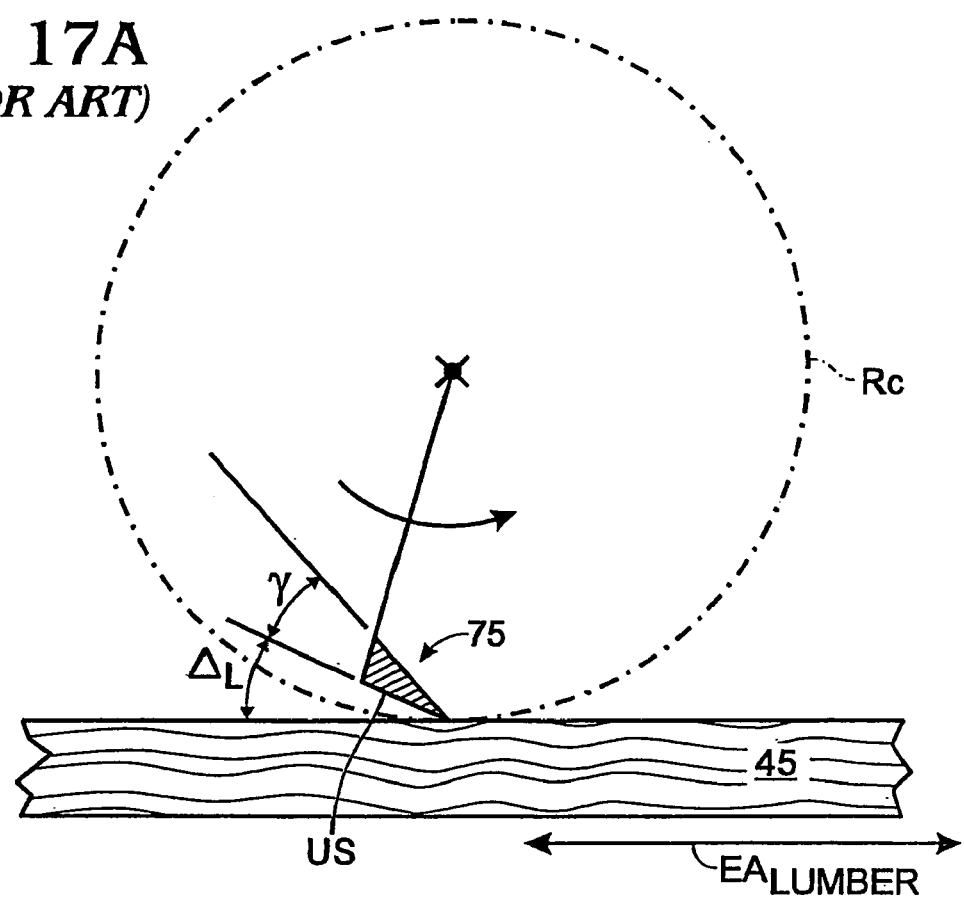
FIG. 17A is a schematic view of a face-cutting knife cutting an article of wood, showing an angle $\Delta_1$, to avoid hammering the wood as known in the prior art.

Referring to FIG. 17A, a schematic drawing of an elongate article of lumber 45 is shown being cut or chipped by a knife 75 rotating in the direction indicated and defining a cutting arc "Rc." The knife 75 corresponds to the face-cutting knife 50 of the center portion 47 of the planer head 46 shown in FIG. 10. The article 45 extends along an elongate axis "$EA_{LUMBER}$." An angle $\Delta_L$ with respect to the elongate axis having some nonzero magnitude must be provided to avoid hammering the wood with an undersurface "US" (or 60a in FIG. 12A) of the knife 75. Such hammering deleteriously affects the surface finish provided by the knife.

Figure 17B:
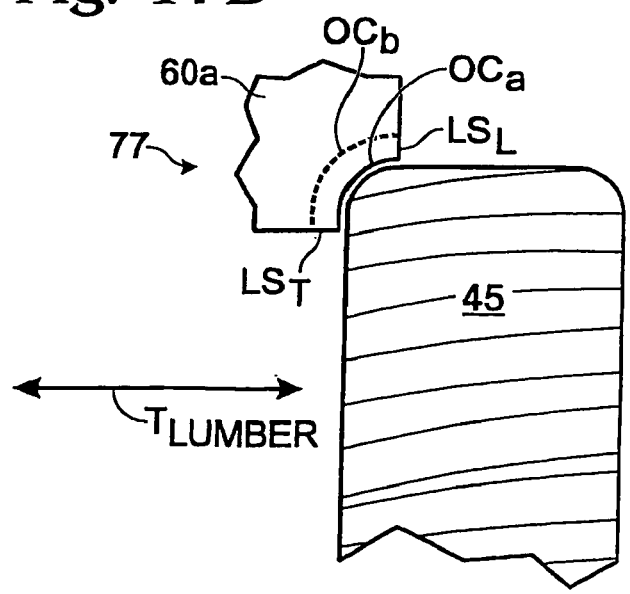
FIG. 17B is a schematic view of a corner-cutting knife according to the present invention shown relative to the article of lumber of FIG. 17A.
Figure 18:
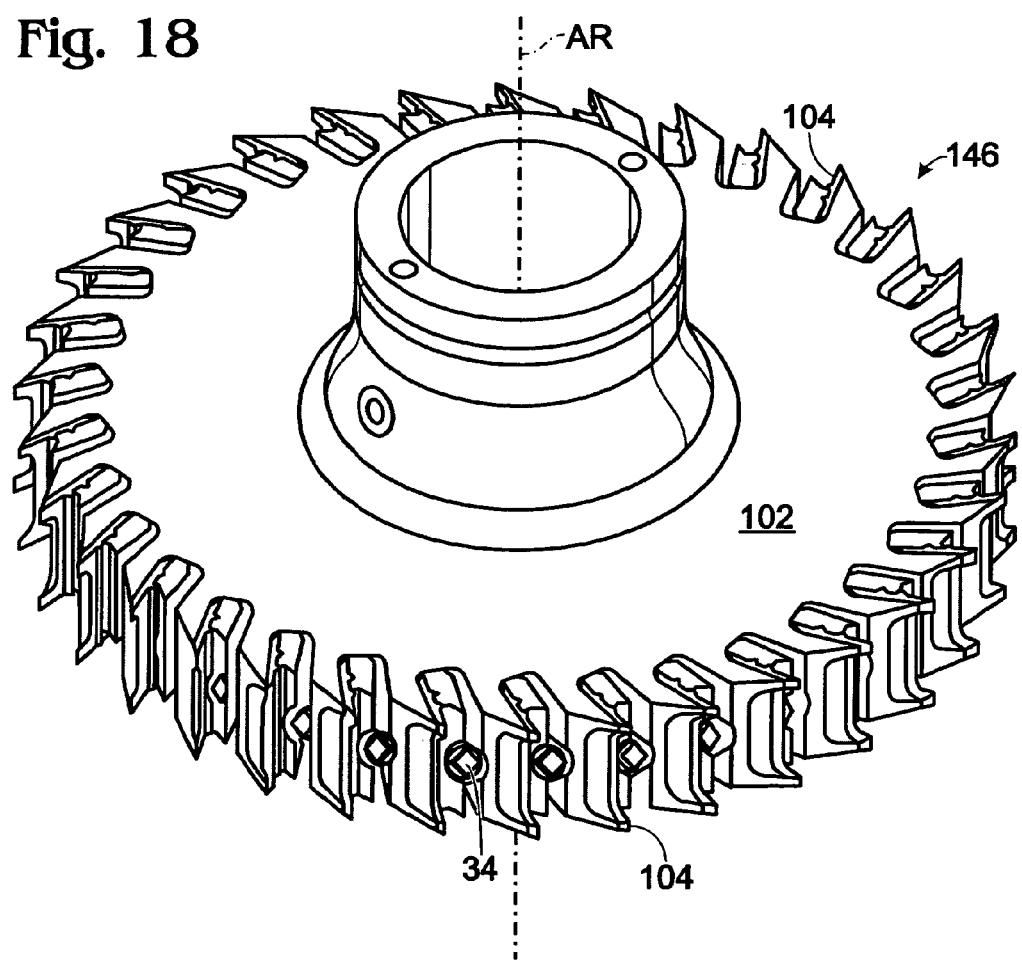
FIG. 18 is an isometric view of a side-cutting planer head according to the present invention that provides a single set of identical knives for making both face and corner cuts.

FIG. 17B views the article of wood shown in FIG. 17A from a direction perpendicular to the axis "$EA_{LUMBER}$." The knife 75 is omitted, but a corner-cutting knife 77 according to the present invention is shown. The knife 77 has a front side 60a and two outer contours OCa and OCb as described above. The line segment "$LS_L$" in FIG. 17B corresponds to the line segment "$LS_{16B}$" in FIG. 16B and, therefore, provides an attack relief angle γ as shown in FIG. 16B. Thence, line segments LS are provided by the knife 77 in the longitudinal direction, i.e., the direction of "$EA_{LUMBER}$."

An outstanding advantage of the knife 77 is that the knife 77 also provides line segments LS oriented in the transverse direction "$T_{LUMBER}$." Particularly, the line segment "$LS_T$" shown in FIG. 17B corresponds to the line segment "$LS_{16D}$" in FIG. 16D and, therefore, provides an attack relief angle γ as shown in FIG. 16D. Moreover, according to the present invention, the knife 77 provides an attack relief angle of γ in every and all intermediate directions. In the preferred embodiment of the invention the attack relief angle is constant over the surface "Fb" (FIG. 16A) as mentioned above; however, this is not essential.

The curvilinear knife 77 according to the present invention is provided independent of the corresponding face-cutting, linear knife and it is therefore relatively easy to provide an optimally configured surface Fb. For example, it is relatively easy to manufacture the knife 77 with a constant attack angle of relief over the entire surface Fb. Moreover, because the curvilinear knives are staggered with respect to the corresponding face-cutting knives so that their cutting surfaces overlap, jointing the knives does not increase the width of the cut or cause surface imperfections such as lines at the apparent points of joinder of the respective cutting surfaces.

As described above, the side-cutting planer head 46 has a face-cutting center portion 47 and two corner-cutting end portions 49 (see FIG. 10) employing discrete hubs that may be joined together but which may be integrally formed. In any case, the portion 47 carries a set of identical knives 30 for making face cuts, and each portion 49 carries identical knives 60 for making corner cuts. Turning now to FIGS. 18-21, a side-cutting planer head 146 according to the invention is shown that provides a single set of identical knives for making both face and corner cuts.

Figure 21:
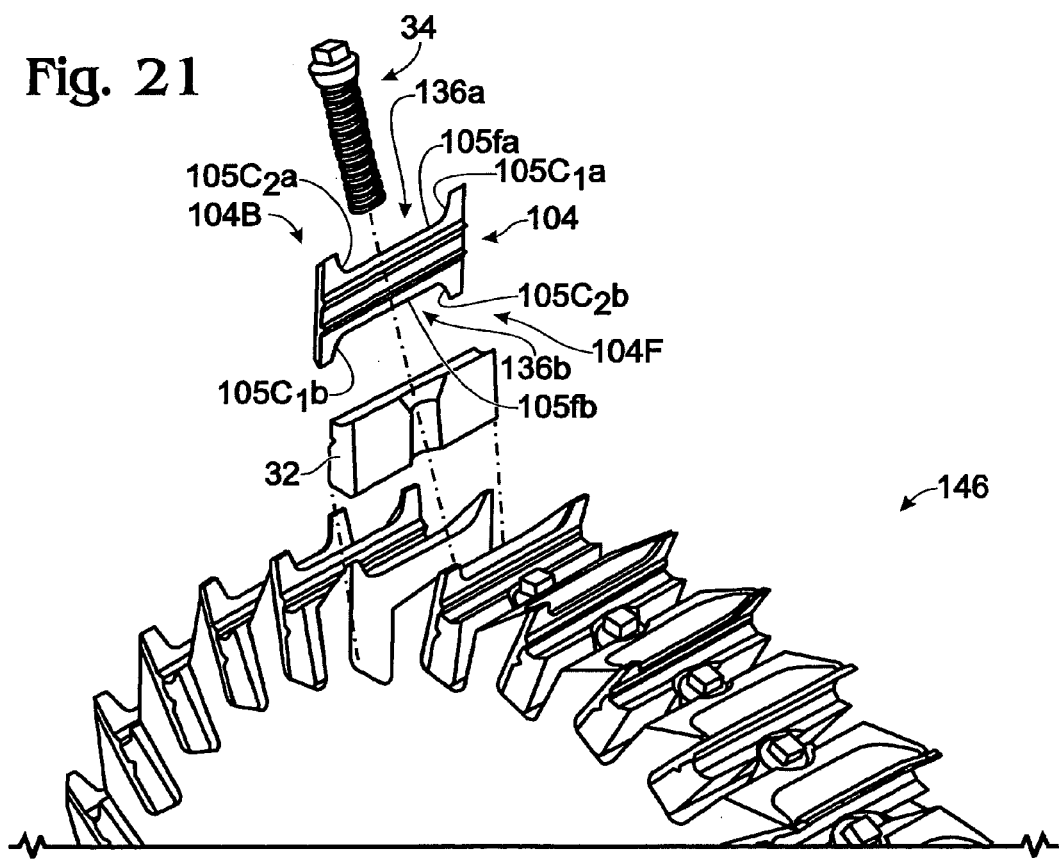
FIG. 21 is an exploded view of the portion of the planer head of FIG. 19 showing, among other things, a front side of a preferred knife for use in the planer head according to the invention.

The side-cutting planer head 146 has a hub 102 for rotating a plurality of knives 104 about an axis of revolution "AR." As best seen in FIG. 21, each knife 104 can be held in place with a single screw 34 and gib 32 as described above for holding the knives 30 in the hub 28 of the face-cutting planer head 26 (compare FIG. 21 with FIG. 10).

Figure 19:
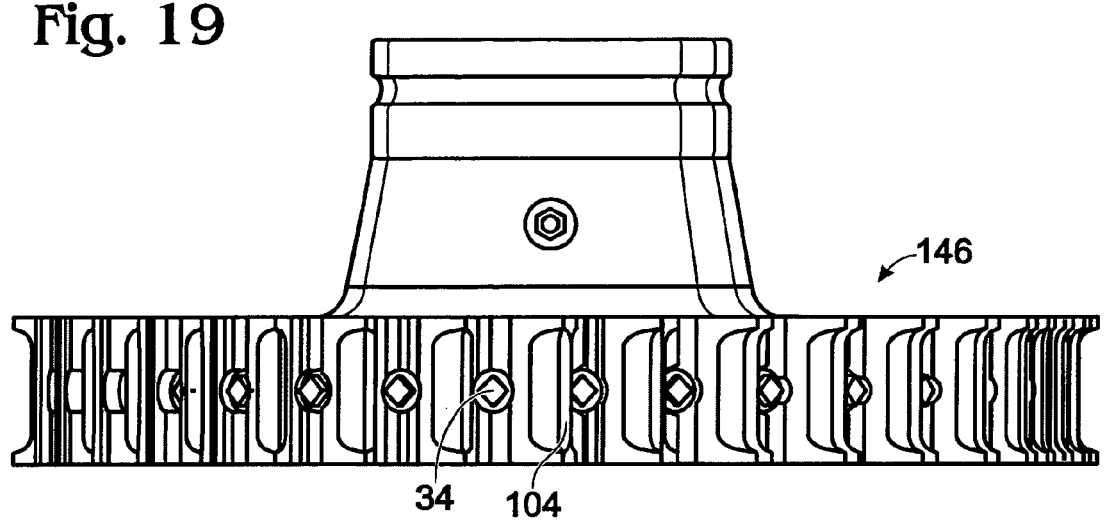
FIG. 19 is a side elevation of the planer head of FIG. 18.
Figure 20:
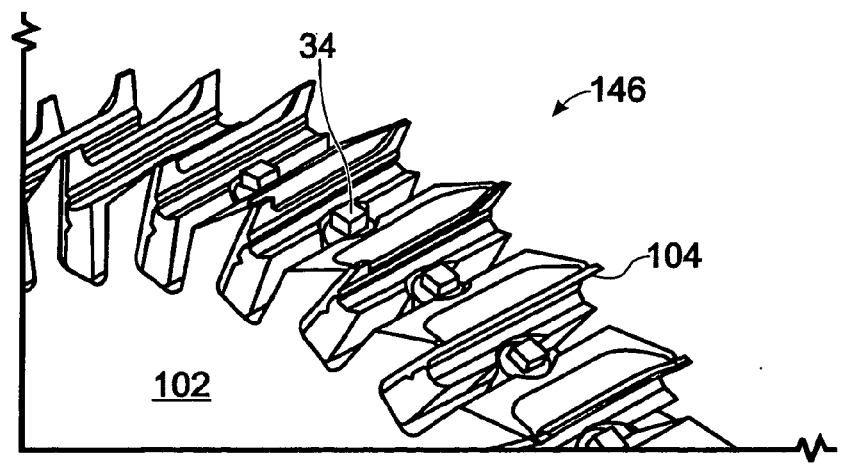
FIG. 20 is a perspective view of a portion of the planer head of FIG. 18, showing in more detail the knives and the manner in which the knives are clamped.

By comparing FIG. 9B and FIG. 19, it can be seen that the side-cutting planer head 146 may have a reduced profile, or overall width as compared to the head 46, which allows for greater machine clearance because, essentially, two of the three hubs may be omitted. This also reduces the time required for making knife changes, since one knife in the head 146 corresponds to three knives in the head 46.

Figure 22:
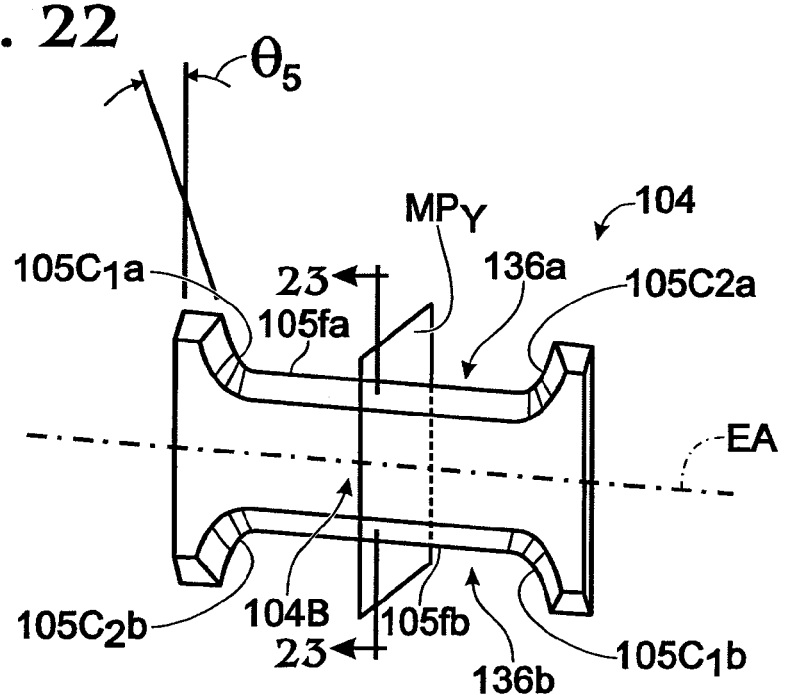
FIG. 22 is a back side pictorial view of the knife of FIG. 21
Figure 23:
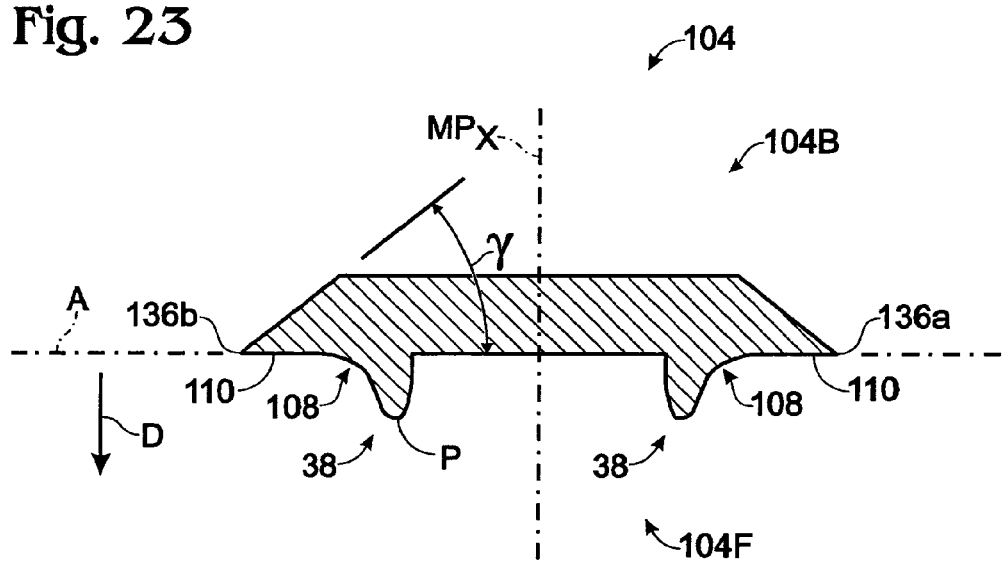
FIG. 23 is a cross-sectional view of the knife of FIG. 22, taken along a line 23-23 thereof.

FIGS. 21 and 22 show the knife 104 from the front and back sides, referenced as 104F and 104B, respectively. The front side of the knife faces in the direction of rotation of the planer head. FIG. 23 shows a cross-section of the knife.

The knife 104 is preferably double-sided and has mirror image symmetry about a mirror Plane "$MP_x$" (FIG. 23). The knife therefore has two mirror image cutting edges 136a and 136b and the knife may be removed from the planer head 146, turned end-for-end, and reinstalled in the planer head to produce a fresh cutting edge.

Each cutting edge includes a straight, face-cutting edge 105f, namely 105fa and 105fb, disposed between two arcuate, preferably semi-circular corner-cutting edges $105c_1$ (namely $105c_1a$ and $105c_1b$) and $105c_2$ (namely $105c_2a$ and $105c_2b$). The corner-cutting edges are concave, i.e., by comparison to the knife 60 of FIG. 15A, respective lines bisecting the corner-cutting edges $105c_{1-2}$, extending from respective points of intersection therewith to respective centers of curvature thereof converge so as to cross one another as shown in FIG. 15B.

As can be seen in FIGS. 21 and 22, the knife 104 has an additional mirror image symmetry about a plane perpendicular to the mirror plane $MP_x$, which lies in the plane of FIG. 23, and which is referenced in FIG. 22 as "$MP_Y$." The two face-cutting edges 105f are parallel to each other, and are parallel to the mirror plane $MP_x$ and perpendicular to the mirror plane $MP_Y$. Referring particularly to FIG. 22, on the outermost side of the corner-cutting edges $105c_{1-2}$ are linear cutting edges "SC" that form a relief angle $\theta_5$ with respect to the mirror plane $MP_Y$.

The back side 104B of the knife is preferably planar, while the front side 104F is preferably planar as well except that there are preferably provided two projecting deflector ridges 38, namely 38a and 38b, corresponding to the cutting edges 136a and 136b respectively, as described above in connection with the knife 30. However, one deflector ridge that preserves the knife's reflective symmetry may also be used.

As it has been defined for the knife 60, the knife 104 has a fixed attack relief angle γ, over at least the face-cutting and corner-cufttng edge portions of the cutting edges 136a and 136b, that is preferably in the range of 25-40 degrees.

With particular reference to FIG. 23, the deflector ridges 38 include respective single linear edges (points "P") of greatest maximum projection of the knife and away from the front side 104F, i.e., in the direction "D," with respect to a plane "A" defined by the two face-cutting edges 105f. The deflector ridges have smooth and concave curved outer surfaces 108 that join corresponding knife-edge-joining portions 110 that are substantially planar. The knife-edge-joining portions 110 may lie in the plane A, such as shown, or they may be angled from the plane A, such as would result from grinding these surfaces to alter the angle of attack of the knife as is known in the art.

It is to be recognized that, while a particular high speed planer head has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A knife for a cutting apparatus adapted to rotate the knife about an axis of revolution, the knife having a front and back side, the front side for facing in the direction of rotation, two cutting edges and mirror image symmetry about a first mirror plane passing through said knife, wherein said cutting edges include respective linear face-cutting edge portions disposed between two concave, arcuate corner-cutting edge portions, wherein said mirror plane is parallel to said face-cutting edge portions, and wherein said knife has an attack relief angle $\gamma$ that is fixed over at least said face-cutting edge portion and said corner-cutting portions.

2. The knife of claim 1, wherein said knife includes two spaced apart deflector ridges projecting from said front side, said deflector ridges having respective concave curved outer surfaces joining respective, substantially planar knife-edge-joining portions terminating in said cutting edges, each deflector ridge having a single linear edge of maximum projection away from said front side.

3. The knife of claim 2, wherein said corner-cutting portions are semi-circular, for producing a radius cut.

4. The knife of claim 1, wherein said corner-cutting portions are semi-circular, for producing a radius cut.

5. The knife of claim 4, wherein said angle $\gamma$ is in the range of 25-40 degrees.

6. The knife of claim 3, wherein said angle $\gamma$ is in the range of 25-40 degrees.

7. The knife of claim 2, wherein said angle $\gamma$ is in the range of 25-40 degrees.

8. The knife of claim 1, wherein said angle $\gamma$ is in the range of 25-40 degrees.

9. The knife of claim 8, having mirror image symmetry about a second mirror plane that is perpendicular to said first mirror plane.

10. The knife of claim 7, having mirror image symmetry about a second mirror plane that is perpendicular to said first mirror plane.

11. The knife of claim 6, having mirror image symmetry about a second mirror plane that is perpendicular to said first mirror plane.

12. The knife of claim 5, having mirror image symmetry about a second mirror plane that is perpendicular to said first mirror plane.

13. The knife of claim 4, having mirror image symmetry about a second mirror plane that is perpendicular to said first mirror plane.

14. The knife of claim 3, having mirror image symmetry about a second mirror plane that is perpendicular to said first mirror plane.

15. The knife of claim 2, having mirror image symmetry about a second mirror plane that is perpendicular to said first mirror plane.

* * * * *